United States Patent [19]

Hajikano et al.

[11] Patent Number: 4,993,018
[45] Date of Patent: Feb. 12, 1991

[54] SELF-ROUTING SWITCHING SYSTEM WITH MULTIPLE LINK CONNECTIONS BETWEEN INCOMING AND OUTGOING LINES

[75] Inventors: Kazuo Hajikano, Tokyo; Koso Murakami; Shunji Abe, both of Yokohama; Tetsuo Nishino, Kawasaki; Toshimasa Fukui, Kawasaki; Osamu Isono, Kawasaki; Tetsuo Tachibana, Kawasaki; Eisuke Iwabuchi; Hichiro Hayami, both of Yokohama, all of Japan

[73] Assignee: Fujitsu Limited, Kawasaki, Japan

[21] Appl. No.: 280,723

[22] PCT Filed: Feb. 5, 1988

[86] PCT No.: PCT/JP88/00113
§ 371 Date: Oct. 6, 1988
§ 102(e) Date: Oct. 6, 1988

[87] PCT Pub. No.: WO88/05982
PCT Pub. Date: Aug. 11, 1988

[30] Foreign Application Priority Data

| Feb. 6, 1987 | [JP] | Japan | 62-26164 |
| Mar. 18, 1987 | [JP] | Japan | 62-63554 |
| Mar. 18, 1987 | [JP] | Japan | 62-63555 |
| May 19, 1987 | [JP] | Japan | 62-120296 |
| May 20, 1987 | [JP] | Japan | 62-121054 |
| Jul. 15, 1987 | [JP] | Japan | 62-176466 |
| Jul. 16, 1987 | [JP] | Japan | 62-175950 |
| Sep. 16, 1987 | [JP] | Japan | 62-231816 |
| Sep. 16, 1987 | [JP] | Japan | 62-231817 |

[51] Int. Cl.$^5$ .............................. H04J 3/26
[52] U.S. Cl. ........................ 370/60; 370/54
[58] Field of Search ............. 370/60, 58, 94, 54

[56] References Cited

U.S. PATENT DOCUMENTS

| 4,022,982 | 5/1977 | Hemdal | 370/54 |
| 4,173,713 | 11/1979 | Giesken et al. | 370/54 |
| 4,392,221 | 7/1983 | Hesketh | 370/54 |
| 4,550,397 | 10/1985 | Turner et a. | 370/60 |
| 4,630,259 | 12/1986 | Larson et al. | 370/60 |
| 4,651,318 | 3/1987 | Luderer | 370/60 |
| 4,731,878 | 3/1988 | Vaidya | 370/60 |
| 4,811,333 | 3/1989 | Rees | 370/58 |

FOREIGN PATENT DOCUMENTS 904100 7/1986 Belgium .
0113639 7/1984 European Pat. Off. .
0206403 12/1986 European Pat. Off. .

OTHER PUBLICATIONS

The 6th Annual Symposium on Computer Architecture, Apr. 23-25, 1979, IEEE, (New York, U.S.), T.-Y. Feng et al.: "A Microprocessor Controlled Asynchronous Circuit Switching Network".

IEEE Journal on Selected Areas in Communications, vol. SAC-4, No. 8, Nov. 1986, IEEE, (New York, U.S.), J. S. Turner: "Design of an Integrated Services Packet Network".

International Journal of Electronics, vol. 56, No. 6, Jun. 1984, (Basingstoke, Hampshire, GB), S. K. Paranjpe et al.: "A New Concept for Supermodular Alignment Network".

(List continued on next page.)

[57] ABSTRACT

A self-routing switching system including a route setting unit (10) which receives transmission information and identification information given from incoming lines and forms, from the identification information, control information for setting a path to one outgoing line to which the transmission information is to be transferred, and a self-routing speech path (20) which can form a plurality of paths and which selects the most suitable one therefrom by the control information and autonomously guides the transmission information to the destination outgoing line.

29 Claims, 36 Drawing Sheets

OTHER PUBLICATIONS

IEEE Transactions on Computer, vol. C-34, No. 2, Feb. 1985, IEEE, (New York, U.S.), M. Kumar et al.: "Switching Strategies in Shuffle-Exchange Packet-Switched Networks".

Journal of the Institution of Electronic and Radio Engineers, vol. 56, No. 6/7, Jun./Jul. 1986, IERE, (London, GB), M. Nagasawa et al.: "Packet Switching Network Access Protocols for Multi-Media Packet Communications".

Proceedings of the 1981 International Conference on Parallel Processing, Aug. 25-28, 1981, IEEE, (New York, U.S.), R. J. McMillen et al.: "Performance and Implementation of 4×4 Switching nodes in an Interconnection Network for PASM".

*Primary Examiner*—Douglas W. Olms
*Assistant Examiner*—Min Jung
*Attorney, Agent, or Firm*—Staas & Halsey

8 × 8 BANYAN

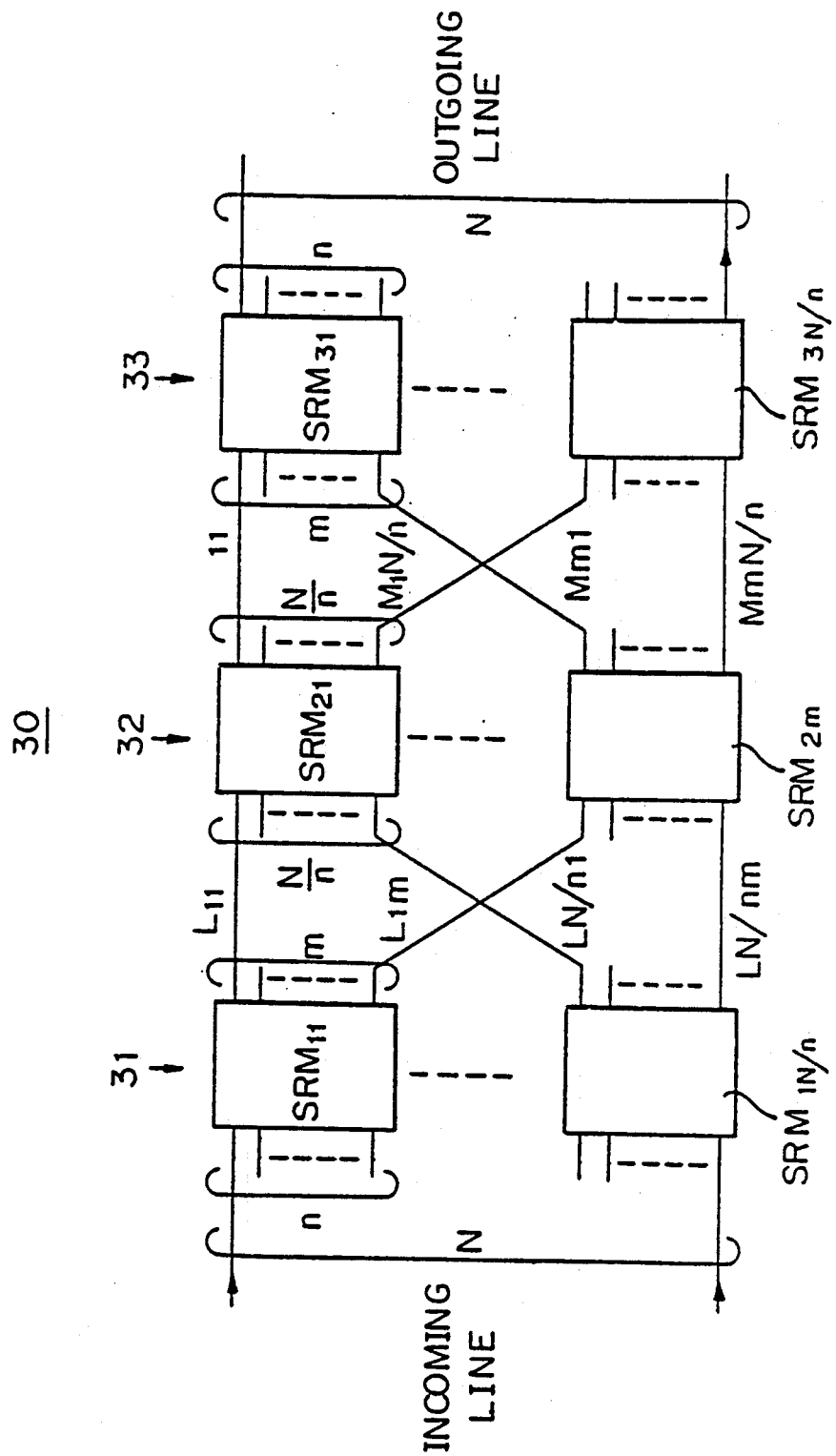

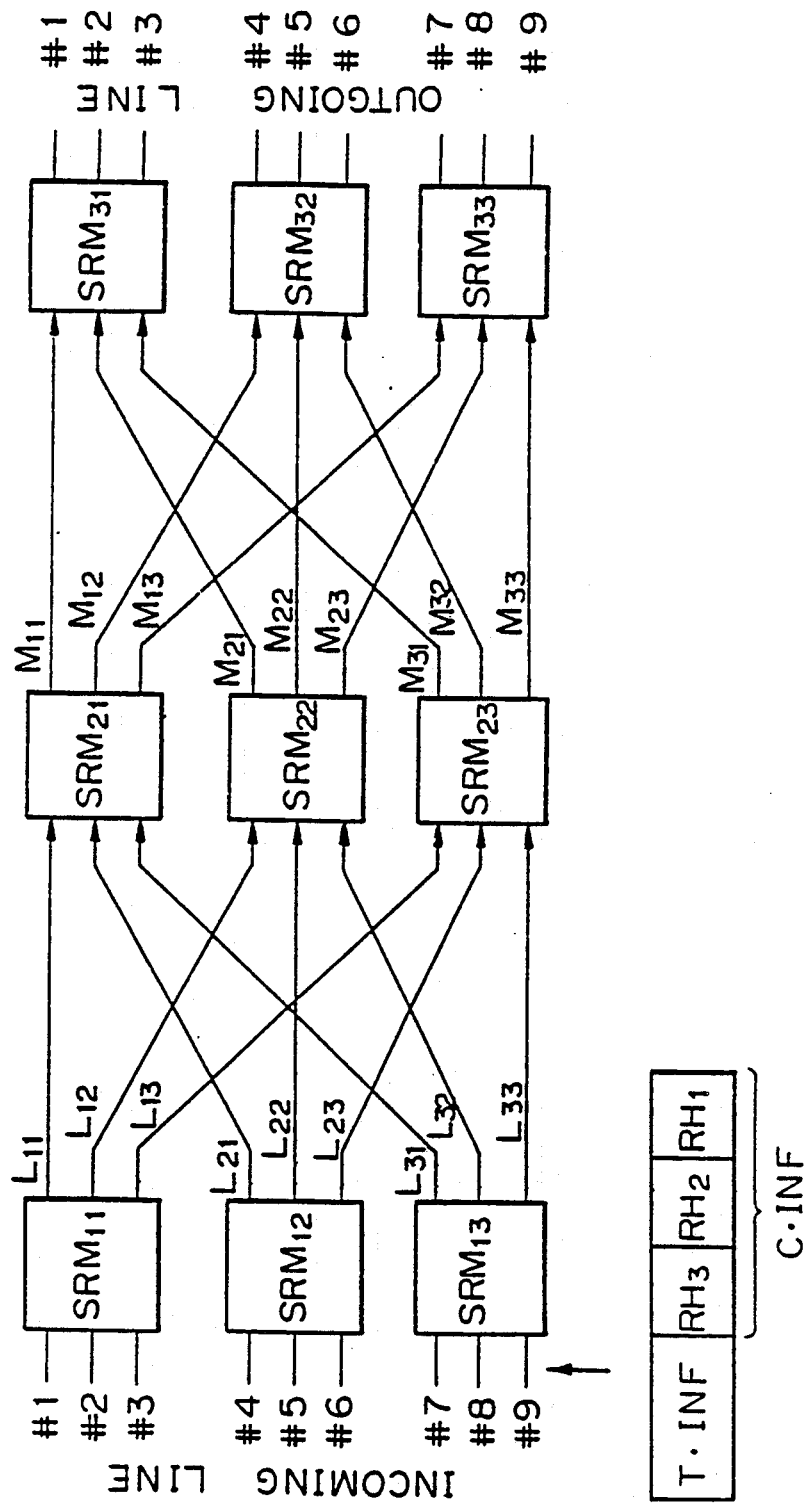

SRSP

4×4·SRSP

2×4·SRM

4 X 2 · SRM

8×8·SRSP

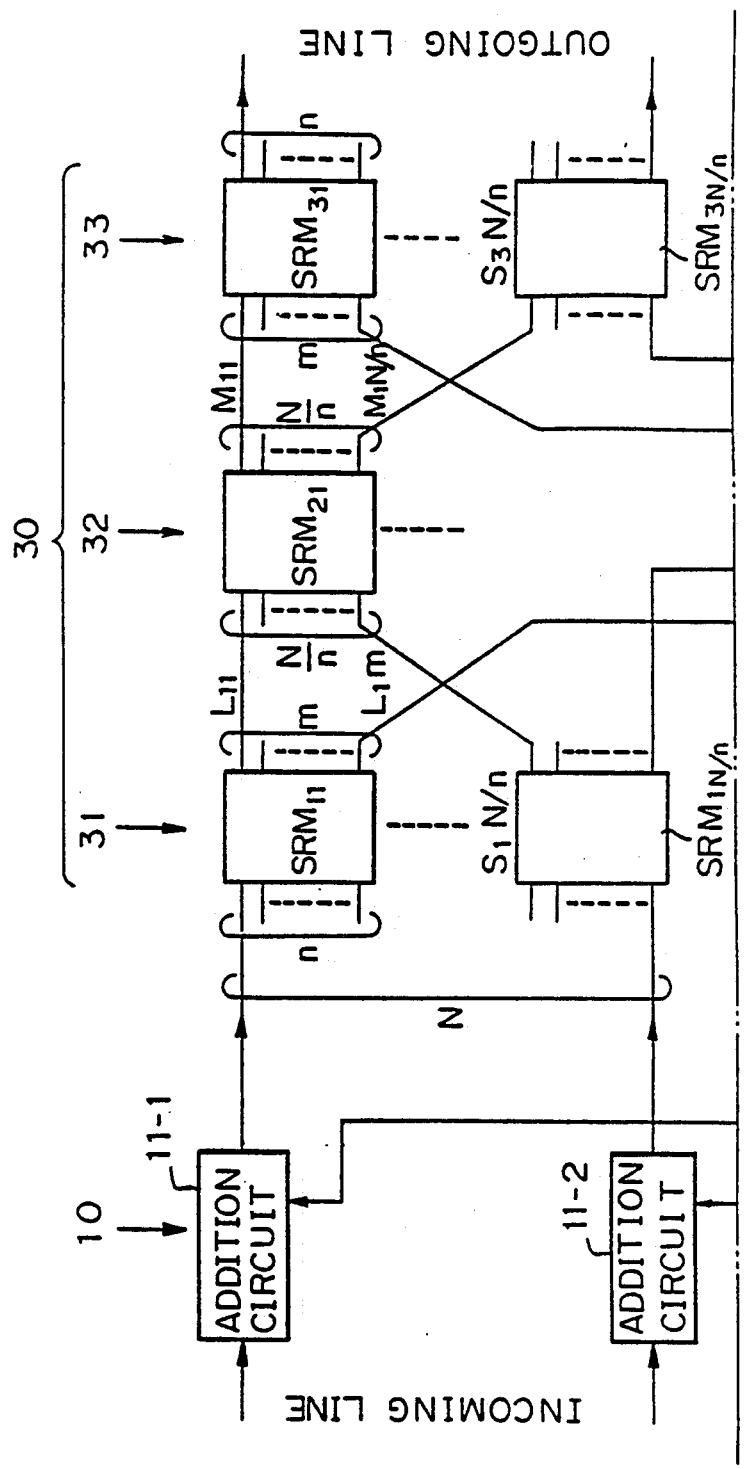

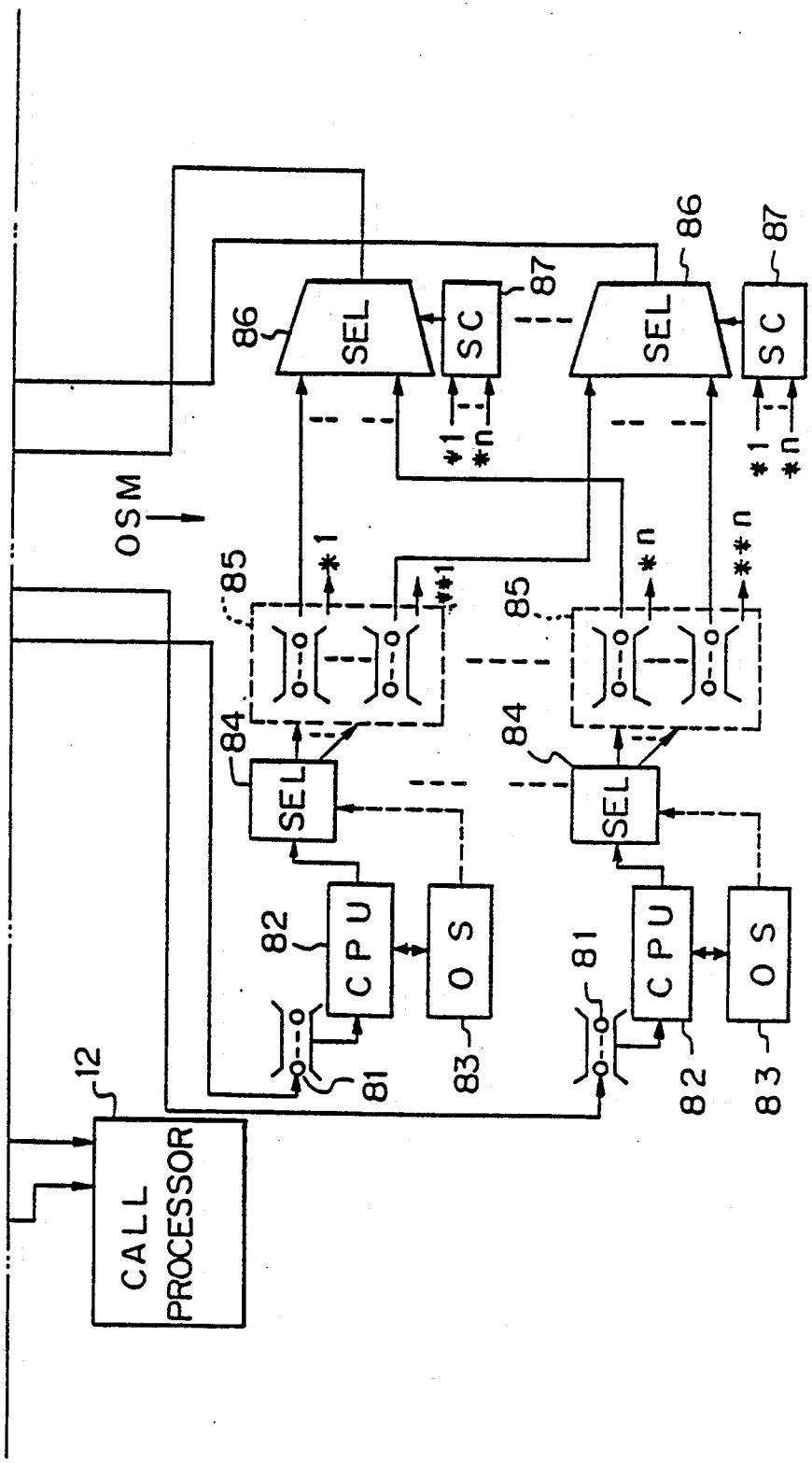

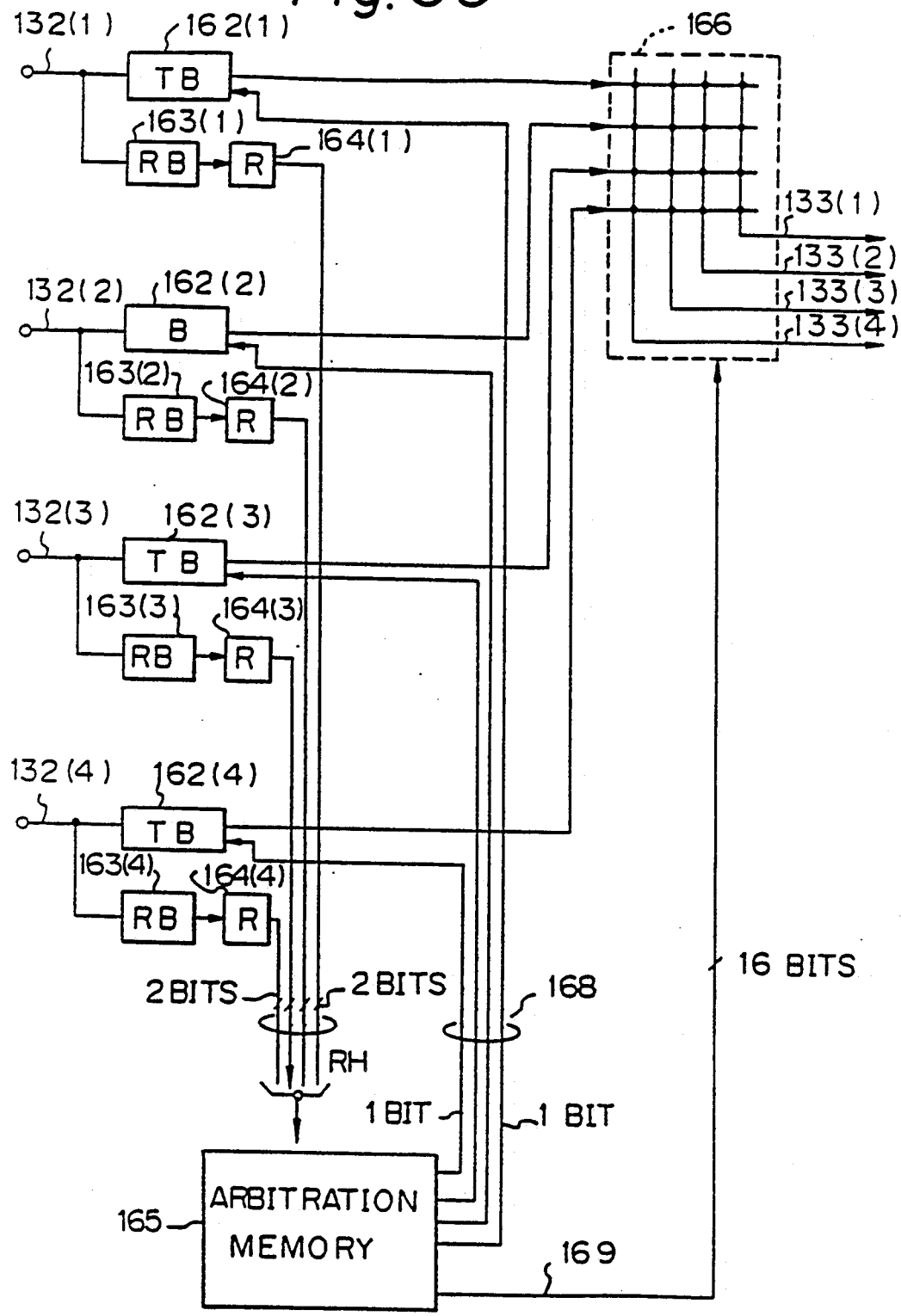

SELF-ROUTING SWITCHING SYSTEM WITH MULTIPLE LINK CONNECTIONS BETWEEN INCOMING AND OUTGOING LINES

TECHNICAL FIELD

The present invention relates to an N×N (where N is a natural number, same below) or N×M self-routing switching system having N number of incoming lines and N or M number of outgoing lines which is optimal for use for high-speed packet switching or asynchronous transfer mode switching.

In telephone switching (line switching), once speech path is set up, the speech path is maintained until the conversation of the call is finished. In the case of multiplex transmission, calls (channels) are switched at a high speed, but the positions of the calls on the frame remain the same, so simple sequential switching is sufficient. As opposed to this, with packet switching, each of the packets has its own destination The destinations of the packets as seen by a time series are diverse, so the above two methods cannot be used. Therefore, a method is adopted of placing a packet into a memory once and then distributing the same to outgoing lines (memory switching). However, this memory switching requires time, so it is not suitable in cases where high-speed switching is required.

A self-routing speech path is suitable for cases of high-speed switching to different outgoing lines for each packet or each cell (asynchronous transfer mode blocks), such as high-speed packet switching or asynchronous transfer mode switching, and for cases where centralized control of the speech path by software is not desired because of the need for high speed call processing.

PRIOR ART

A so-called Banyan-type self-routing speech path has already been proposed in, for example, 1986 INTERNATIONAL ZURICH SEMINAR ON DIGITAL COMMUNICATIONS D4.1, pp. 135–139 "EXPERIMENTS IN WIDEBAND PACKET TECHNOLOGY" R. W. Muise et al.

FIG. 1 is a circuit diagram showing a Banyan-type self-routing speech path as an example of the prior art. This is comprised of 2×2 unit self-routing switches $S_{ij}$ (where ij is 11, 12, . . .) by reverse shuffle wiring as shown in the illustration (in this example, an 8×8 Banyan is shown). Each packet of the incoming line side is given control information showing the outgoing lines (in this example, binary-notation outgoing line number). Using the control information, each switch is operated and the transmission information (INF) sent to the designated outgoing line. For example, when the control information is "010" and the packet is input to IN of the $S_{11}$, the first stage (i=1) switch sends the packet to its own "0" output since the MSB of the control information is "0". Receiving this, $S_{21}$ views the next bit of the MSB and since this is "1", sends it to the "1" output. Receiving this, $S_{32}$ views the LSB and since this is "0" sends it to the "0" output. In this way, the packet is sent to the target outgoing line 010.

FIG. 2 is a view showing the construction in the case of expanding the scale of the speech path of FIG. 1. In the above-mentioned Banyan-type self-routing speech path, to increase the number of incoming and outgoing lines, for example, to make a 16×16 Banyan, the construction of FIG. 2 is adopted. That is, two 4×4 Banyans are arranged, four 2-unit switches are arranged at the outgoing side, and wiring performed as illustrated to construct an 8×8 Banyan. Similarly, two 8×8 Banyans are arranged eight 2×2 unit switches are arranged at the outgoing side, and wiring performed as illustrated to construct a 16×16 Banyan. A 32×32 Banyan etc. can be similarly constructed. In general, any N×N Banyan can transmit information to a targeted outgoing line by log2 N stage cascade connection of 2×2 unit switches. Note that in a unit switch, the outgoing terminal is given twice the operating speed of the incoming terminal to avoid congestion.

As mentioned above, a Banyan type self-routing speech path is constructed based on the principle of dichotomization, so expansion of scale is achieved by combining two N×N switches and N number of 2×2 switches to make a 2N×2N switch. The increases are in units of multiples of 2. A modular construction is difficult and it is necessary to relay all the wirings on the outgoing line side. Therefore, there are practical inconveniences as a speech path built into a selfrouting switching system.

SUMMARY OF THE INVENTION

The present invention has as its object the improvement of the above points and the provision of a self-routing switching system which enables an increase in the capacity of the switch modules to a sufficient extent and enables easy conversion from small capacity to large capacity without the need for revising preexpansion wiring.

To achieve the above object, the present invention constructs a self-routing switching system by a selfrouting speech path with multi routes, an improvement of a Banyan-type self-routing speech path.

BRIEF DESCRIPTION OF THE DRAWINGS

The present invention will be further described in connection with its embodiments, with reference being made to the accompanying drawings, wherein:

FIG. 3 is a view showing a first embodiment of a speech path in a self-routing switching system according to the present invention;

FIG. 6 is a concrete example of a speech path of the first embodiment shown in FIG. 3;

FIGS. 20, 20A, and 20B are circuit diagram of a self-routing switching system showing details, in particular, of the portion of the optional service module of FIG. 19;

FIG. 39 is a circuit diagram showing a specific example for realizing the fifth embodiment of FIG. 38.

DESCRIPTION OF THE PREFERRED EMBODIMENTS

FIG. 3 is a view showing a first embodiment of a speech path in a self-routing switching system according to the present invention. The self-routing speech path 30 of the first embodiment is comprised of one or a plurality of basic switching units. In this figure, a speech path 30 comprised of a single basic switching unit is shown. This basic switching unit is comprised of an input stage self-routing switch module (SRM) 31, a middle stage self-routing switch module (SRM) 32, and an output stage self-routing switching module (SRM) 33. In the present invention, a multiple link connection is used for the $SRM_{ij}$'s.

Figure 1:
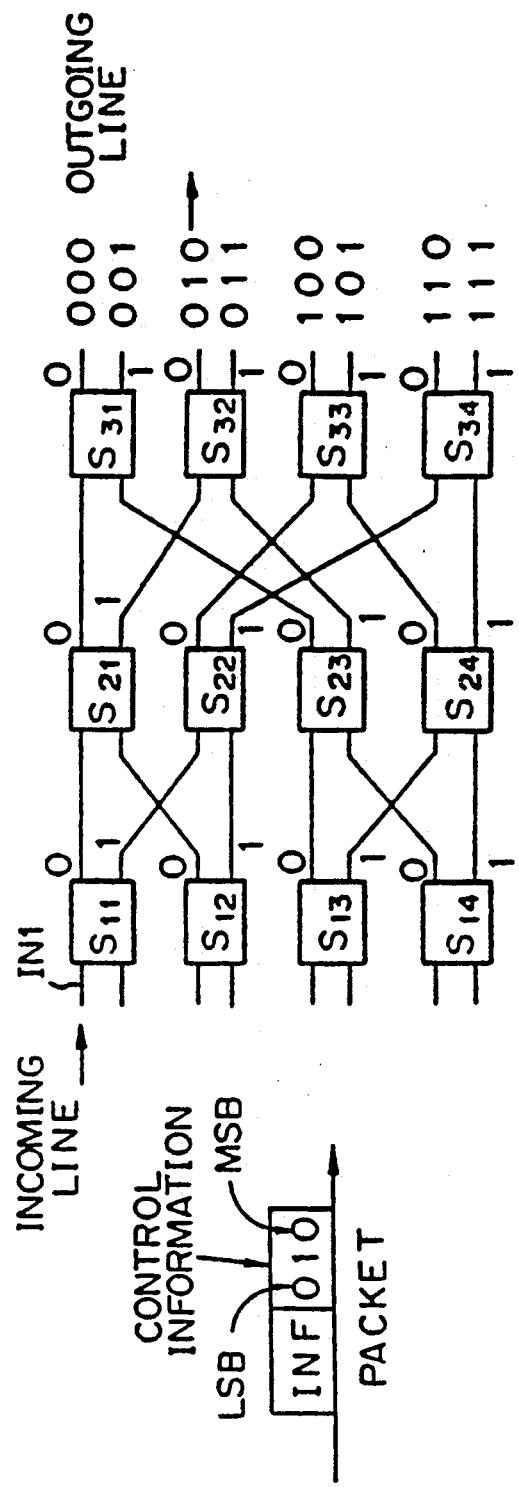
FIG. 1 is a circuit diagram showing the prior art, i.e., a Banyan type self-routing speech path.

Even in the Banyan type speech path, a multiple connection was used for the unit switches $S_{ij}$, but not a multiple link connection. There was only one path formed between the incoming lines and outgoing lines. For example, when the transmission information entering $S_{11}$ of FIG. 1 was to go to the outgoing line 111, there was only one route, $S_{11} \rightarrow S_{22} \rightarrow S_{34}$, i.e., there was no other route such as $S_{11} \rightarrow S_{23} \rightarrow S_{34}$. In this regard, in the multiple link connection of the present invention, there is in addition to $SRM_{11} \rightarrow SRM_{21} \rightarrow SRM_{31}$, other paths such as $SRM_{11} \rightarrow S_{2m} \rightarrow SRM_{31}$.

With N number of incoming lines, the input stage SRM switches $SRM_{11}$ to $SRM_{1N/n}$ have n number of input ends and m number of output ends and are N/n in number, the middle stage $SRM_{12}$ modules $SRM_{21}$ to $SRM_{2m}$ have N/n number of input ends and N/n number of output ends and are m in number, and the output stage SRM modules $SRM_{31}$ to $SRM_{3n/N}$ have m number of input ends and n number of output ends and are n/N in number. $L_{ij}$ are the primary links, and $M_{ij}$ the secondary links.

The input ends of the input stage modules (31) $SRM_{11}$ to $SRM_{1N/n}$ are connected to the incoming while the output ends are connected to the input ends of the middle stage modules 32. The m number of output ends of the $SRM_{11}$ are connected to corresponding ones of the input ends of the m number of middle stage SRM modules $SRM_{21}$ to $SRM_{2m}$. The $SRM_{1N/n}$ module etc. are similarly connected. The N/n number of output ends of the middle stage modules are connected to corresponding ones of the m number of input ends of the outgoing line side N/n number of modules $SRM_{31}$ to $SRM_{3N/n}$.

In this example, the switch modules $SRM_{ij}$ are built into a three-stage construction of an input stage, a middle stage, and an output stage. Further, the middle stage may, like in FIG. 3, be made three-staged in construction, giving a total of five stages (with two basic switching units). Further, the total number of input ends of the input stage switch modules $SRM_{11}$ to $SRM_{1N/n}$ is N, the same as the number of incoming lines, while the number of output ends of the output stage switch modules $SRM_{31}$ to $SRM_{3N/n}$ is N, equal to the number of outgoing lines. Further, the number of input ends of the middle stage switch modules $SRM_{21}$ to $SRM_{2m}$ is mN/n, equal to the number of output ends of the input stage switch modules. The number of output ends is also mN/n, equal to the number of input ends of the output stage switch modules. In the example shown, therefore, there are no idle modules, but idle ones may be made. In particular, when expansion is envisioned, a larger number of middle stage switch modules may be provided (the number required) and a lesser number of input and output stage switch modules may be provided.

Figure 5:
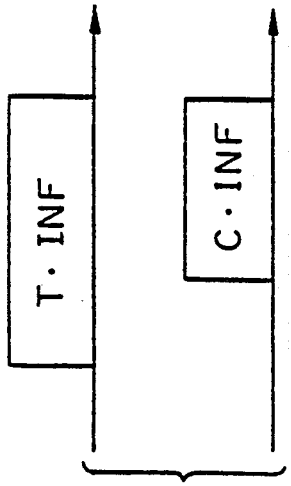
FIG. 5 is a view showing a second example of a format of information appearing on an incoming line.
Figure 4:
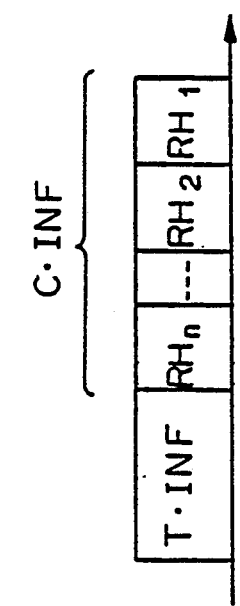
FIG. 4 is a view showing a first example of a format of information appearing on an incoming line.

FIG. 4 is a view showing a first example of a format of information appearing on an incoming line of a self-routing switch path. FIG. 5 is a view showing a second example of a format of information appearing on an incoming line of a self-routing switch path. The packet or cell entering the incoming line is given control information (C.INF) $RH_1$, $RH_2$, ... $RH_n$ comprised of routing headers, as shown in FIGS. 4 and 5. This may be in series with the transmission information (T.INF) such as in FIG. 4 or in parallel such as in FIG. 5. The latter case, of course, requires an exclusive control information line. The control information $RH_1$, $RH_2$ ... shows the number of the ith order link, i.e., the number of the output end of the ith stage switch module. The switch modules view the number and guide the transmission information to the this link, i.e., the designated output end.

In the self-routing speech path 30, the required number (m number) of middle stage switch modules $SRM_{21}$ to $SRM_{2m}$ are provided. If less than the possible number (N/n number) of input and output stage switch modules are provided, then in expansion it is merely necessary to add input and output stage switch modules and perform wiring for the input and output stage switch modules. At this time, there is no need to make any changes on the already installed switch modules or their wiring.

Further, in this self-routing speech path 10, there are a plurality of routes of paths between the incoming lines and outgoing lines. Compared with the Banyan type etc. where there is only one route, this is a great advantage in processing during congestion of traffic. That is, in packet switching or cell switching, in particular when transmitting information, the amount of information generated often changes greatly over time, so with a single path, the transmission delay fluctuates tremendously. However, when there are a plurality of paths as in the present invention, it is possible to disperse the load. Further, during congestion, other routes may be taken and thus the transmission delay may be reduced.

FIG. 6 is a view showing a concrete example of a speech path of the first embodiment shown in FIG. 3. It shows the case where $N \geq 9$ and $n = m = 3$. There are three $3 \times 3$ self-routing switch modules $SRM_{ij}$'s at the input stage, middle stage, and output stage. The primary links $L_{11}$, $L_{12}$, and $L_{13}$ connect the three output ends of the input stage switch module $SRM_{11}$ to the first top input ends of the middle stage switch modules $SRM_{21}$ to $SRM_{23}$. The primary links $L_{21}$ to $L_{23}$ and $L_{31}$ to $L_{33}$ follow this. The secondary links $M_{11}$ to $M_{13}$ connect the three output ends of the middle stage switch module $SRM_{21}$ to the first input ends of the three switch modules $SRM_{31}$ to $SRM_{33}$ of the output stage. The secondary links $M_{21}$ to $M_{23}$ and $M_{31}$ to $M_{33}$ follow the same.

In this self-routing speech path, if, at first, $SRM_{11}$, $SRM_{21}$ to $SRM_{23}$, and $SRM_{31}$ are provided, the installation of $SRM_{12}$ and $SRM_{32}$ and $SRM_{13}$ and $SRM_{33}$ does not require any change of already installed portions and can be performed with just the wiring of $L_{21}$ to $L_{23}$, $L_{31}$ to $L_{33}$, $M_{21}$ to $M_{23}$, and $M_{31}$ to $M_{33}$ as illustrated.

Further, for example, there are three paths leading incoming line #9 to outgoing line #3: $SRM_{13} \rightarrow SRM_{21} \rightarrow SRM_{31}$, $SRM_{13} \rightarrow SRM_{22} \rightarrow SRM_{31}$, and $SRM_{13} \rightarrow SRM_{23} \rightarrow SRM_{31}$. It is thus possible to disperse traffic between $SRM_{13}$ and $SRM_{31}$ to $SRM_{21}$ to $SRM_{23}$. Further, when traffic concentrates in $SRM_{21}$ and a delay occurs, it is only necessary to change to a path through $SRM_{22}$ or $SRM_{23}$ to reduce the delay to the minimum possible.

Figure 7:
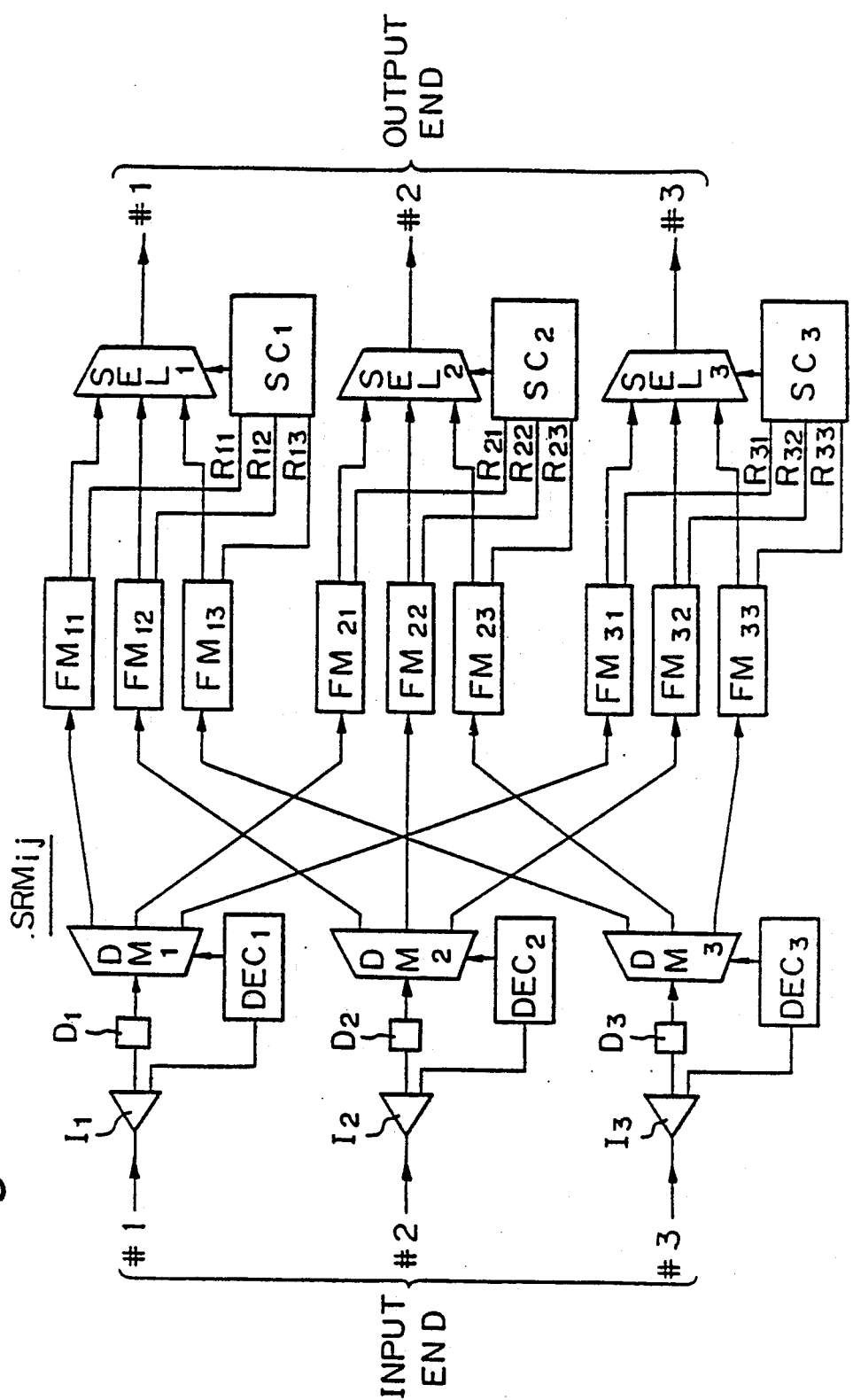
FIG. 7 is a circuit diagram showing a specific example of a self-routing switch module (SRM)

FIG. 7 is a circuit diagram showing a specific example of a self-routing switch module (SRM). It shows the example of a $3 \times 3$ construction SRM. $I_i$ are control information detection circuits, $D_i$ transmission information delay circuits, $DM_i$ demultiplexers, $DEC_i$ control information decode circuits, $FM_{ij}$ buffer memories, for example, first-in first-out (FIFO) memories, $SEL_i$ selectors, and $SC_i$ selector control circuits for receiving the request signals $R_{ij}$ of the FIFO memories $FM_{ij}$ and performing control of the selectors $SEL_i$.

The signals entering the input ends (i) (i=1,2,3) (i) take the form of the afore-mentioned transmission information plus control information (T.INF+C.INF). The detection circuits $I_i$ extract the control information and send it to the decode circuits $DEC_1$. The control information comes in three types, a first stage (input stage) routing header $RH_1$, a second stage (middle stage) routing header $RH_2$, and a third stage (output stage) routing header $RH_3$, when the self-routing speech path is comprised of three stages. The detection circuits $I_i$ extract the corresponding control information according to the stage of the self-routing switch modules SRM. When the input control information indicates an output end j, a decode circuit $DEC_i$ operates a demultiplexer $DM_i$ and sends the transmission information to an FIFO memory $FM_{ji}$. For example, if the control information of the input end #1 indicates the output end #2, the decode circuit $DEC_1$ operates the demultiplexer $DM_1$ and inputs the information of the input end #1 to the FIFO memory $FM_{21}$. When the transmission information enters the FIFO memories $FM_{11}$ to $FM_{13}$, the selector control circuit $SC_1$ operates the selector $SEL_1$ and sends the said transmission information to the output end #1. The same is true for the rest of the selector circuits.

A selector control circuit $SC_j$, for example, continually scans for a request signal $R_{ij}$ from an FIFO memory $FM_{ij}$ and, when a request signal $R_{ij}$ is detected, operates so that the contents of that FIFO memory FM are output through a selector $SEL_i$. Alternatively, a request signal $R_{ij}$ is input to a selector control circuit $SC_j$ as an interruption input and, when an interruption occurs, the selector control circuit $SC_j$ outputs the content of the FIFO memory FM through the selector SEL.

If the FIFO memories $FM_{ij}$ are given a capacity corresponding to a plurality of packets or cells, a buffer function is obtained and sufficient response is possible even when the transmission data increases temporarily.

The self-routing switch modules $SRM_{ij}$ are not limited to ones having three input ends and three output ends and in general may have n number of input ends and m number of output ends, where n>m and n=m or n<m. When n>m, there will be a plurality of input ends making common use of the same output end, but with calls (channel) with small volumes of transmission, this would be sufficient for processing. When n<m, a single input may be divided into two outputs and both input side high speeds and output side low speeds. Of course, the excess amount of outputs may be left unused.

For the same reason, even though $3 \times 3$ self-routing switch modules are used in FIG. 6, the invention is not limited to three middle stage switch modules $SRM_{21}$ to $SRM_{23}$; two or four are also possible. Further, it is not limited to three stages. For example, the whole of FIG. 6 or FIG. 3 may be used as the middle stage and input stage and output stage switch modules added to make a total five-stage construction. Further, by the same method, a seven-stage construction is also possible. However, in general, three stages are appropriate.

The control information C.INF is added in series or in parallel to the call (packet or cell) on the input side as in a Banyan type and the like. On call origination, depending on the call processing, control information for a certain call is determined, then a virtual channel number (VCN) of the call and the control information are registered in a table. In response to an input call, the table is referred to and the control information added. The control information is added since it is needed when the multiple link construction switch module group is passed through, but is not necessary once the outgoing line is reached, so it is then deleted.

As explained above, in accordance with the construction of FIG. 3 to FIG. 7, it is possible to change the number of incoming and outgoing lines without changing the existing wiring. The amount of change is not limited to multiples of 2. The change can be made in units of the number of input and output ends of the switch modules.

The middle state switch modules may be provided in larger numbers than the incoming and outgoing side switch modules in anticipation of an increase in the outgoing lines. However, with multiplexing, its possible to install a number less than the outgoing line side switch modules.

Further, the self-routing speech path 10 may have a plurality of paths linking the incoming and outgoing lines, so there is little delay even with congestion.

Figure 8A:
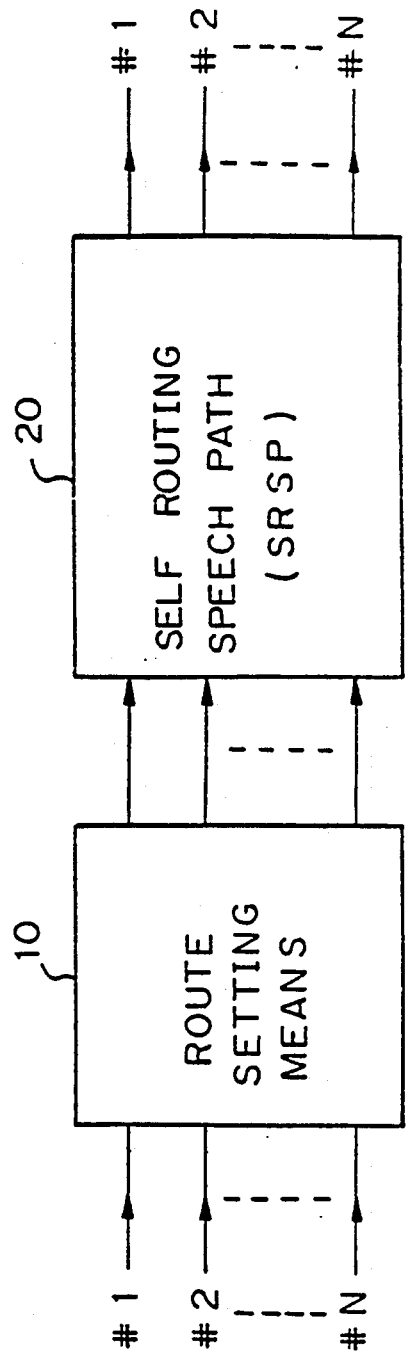
FIG. 8A is a block diagram showing an outline of a self-routing switching system of the present invention.

FIG. 8A is a block diagram showing an outline of a self-routing switching system of the present invention. In the figure, reference numeral 10 is a route setting means and 20 a self-routing speech path (SRSP). The route setting means 10 receives information input from a plurality of incoming lines #1, #2 . . . #N. This information is comprised of pairs of the original transmission information (voice information, facsimile data, computer data, etc.) T.INF and identification information I.INF. The identification information includes the identification number, such as a virtual channel number (VCN), added to the cells under the afore-mentioned asynchronous transfer mode, and to the packets under the aforementioned packet switching network.

The virtual channel number is explained with reference to FIG. 8B.

Figure 8B:
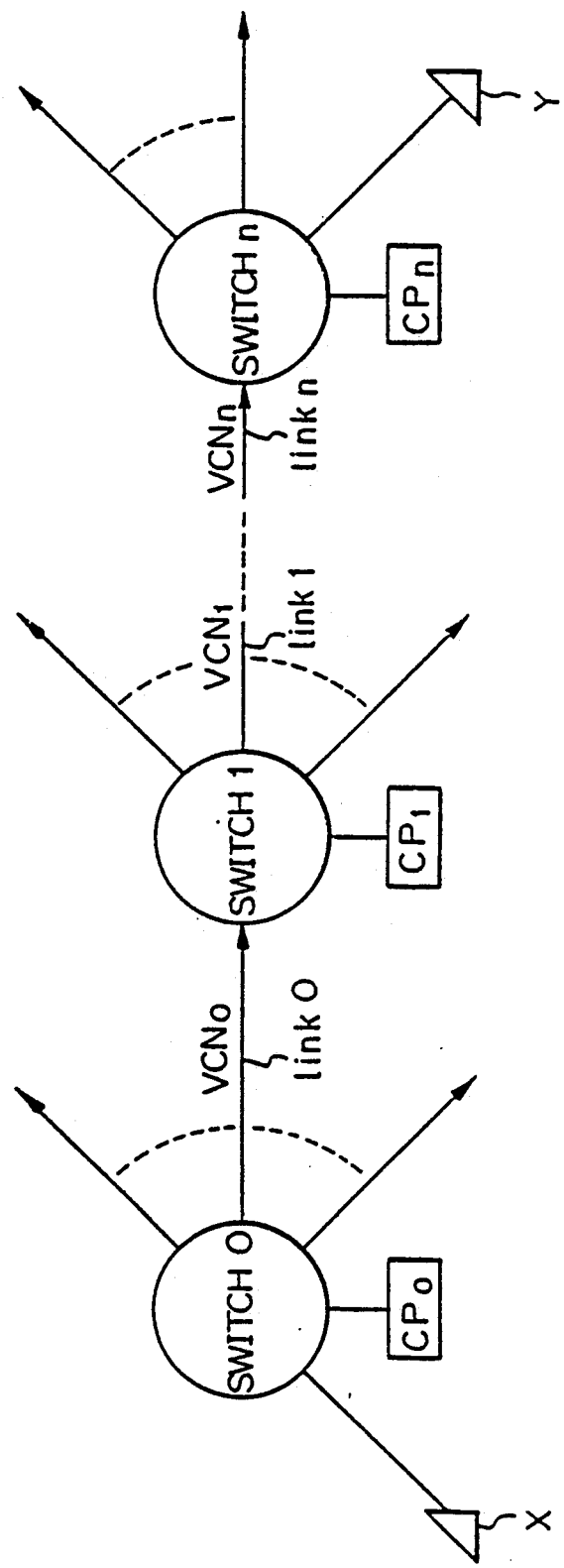
FIG. 8B illustrates a packet switching network.

FIG. 8B illustrates a packet switching network.

In FIG. 8B, SWITCH 0 ~ n are the packet switching systems, $CP_0$ ~ $CP_n$ are the call processors for SWITCH 0 ~ n, X is a calling terminal accommodated by SWITCH 0, Y is a called terminal accommodated by SWITCH n, and $VCN_0$ ~ $VCN_n$ are the virtual channel numbers for link 0 ~ link n.

When $CP_0$ detects the issuance of a call from terminal X, it recognizes the destination of the call (terminal Y) and performs a call setting phase. According to the communication between call processors $CP_0$, $CP_1$ ~ $CP_n$, a transmitting path set, and each call processor allocates the virtual channel numbers $VCN_0$ ~ $VCN_n$ to the call in each link, respectively, and memorizes the correspondence between a pair of the virtual channel numbers, such as $VCN_0/VCN_1$, $VCN_1/VCN_2$, . . . , $VCN_m/VCN_n$.

Then, each call processor performs a packet transfer phase. In the packet transfer phase, the $CP_0$ controls SWITCH 0 to connect a terminal X to link 0, and adds the virtual channel number $VCN_0$ to a head of a packet from terminal X.

When $CP_1$ detects the virtual channel number $VCN_0$, it recognizes a receipt of a packet from terminal X, and a destination of the packet.

$CP_1$ controls SWITCH 1 to connect link 0 to link 1, and adds the virtual channel number $VCN_1$ after exchanging $VCN_0$ to $VCN_1$. The operations of $CP_2$ ~ $CP_{n-1}$ are the same as the above operation of $CP_1$.

When $CP_n$ detects the virtual channel number $VCN_n$, it recognizes the receipt of a packet for terminal Y, so that $CP_n$ controls SWITCH n to transfer the received packet to terminal Y.

In FIG. 8A, the route setting means 10 performs the afore-mentioned call setting phase, but a packet transfer phase is carried out autonomously without a control of the route setting means 10, that is a self-routing switch.

The route setting means 10 monitors the above-mentioned identification information from the information of the incoming lines and forms control information C.INF in accordance with this identification information.

Figure 2:
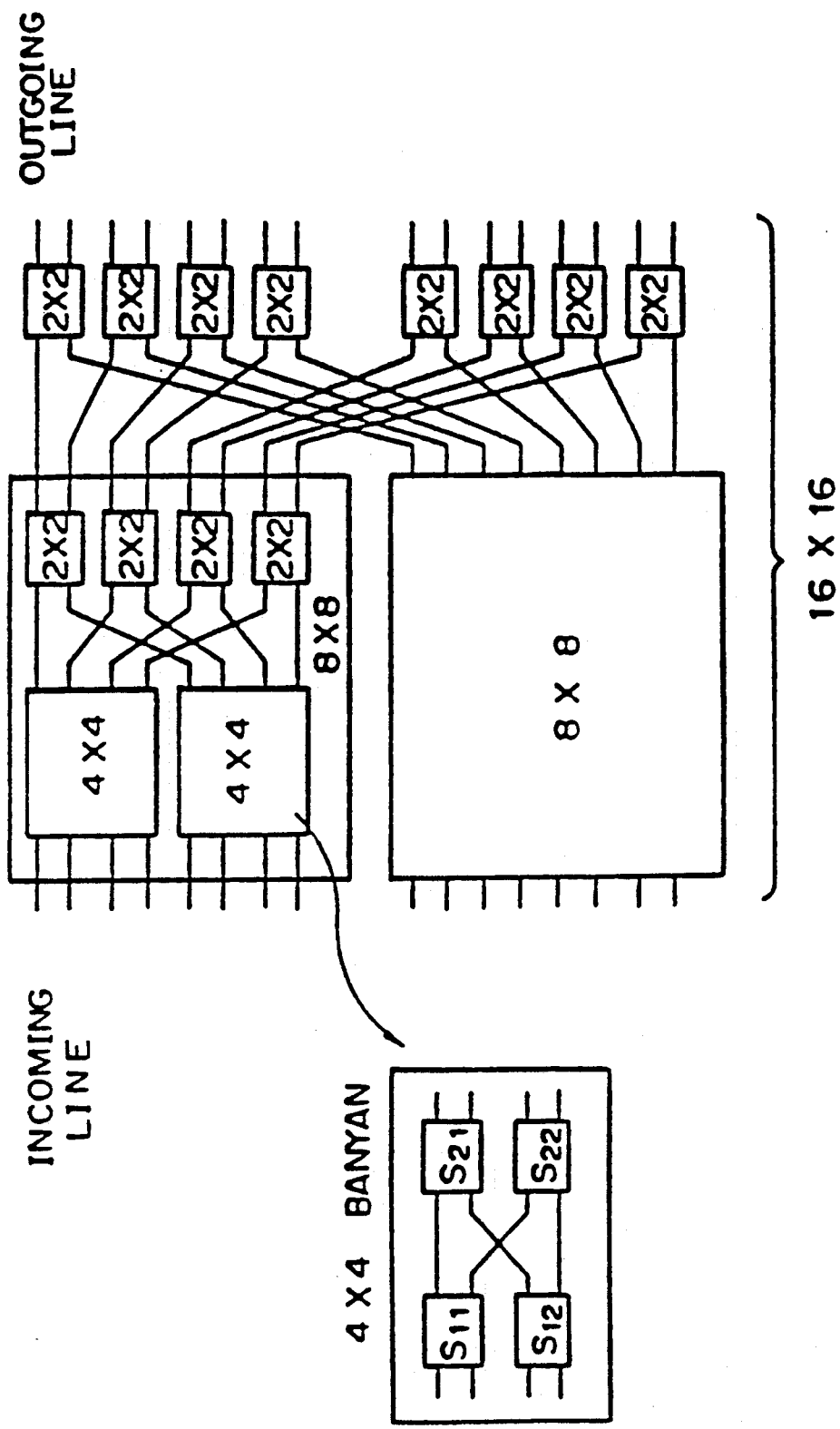
FIG. 2 is a view showing the construction in the case of expansion of the scale of the speech path of FIG. 1.

The self-routing speech path (SRSP) 20 sends the transmission information of the afore-mentioned incoming lines through the afore-mentioned outgoing lines based on the formed control information C.INF. In this case, the self-routing speech path (SRSP) 20 forms multiple paths. With a conventional self-routing speech path (SRSP) (FIG. 1 or FIG. 2), there is only one path running from one incoming line to one outgoing line, but in the self-routing speech path (SRSP) 20 of the present invention, there are a plurality of paths from one incoming line to one outgoing line, forming multiple paths. Which path is selected is determined by the route setting means 10.

Further, the self-routing speech path (SRSP) 20 of the present invention has built in it a buffer memory means which holds temporarily at least the transmission information (if necessary, both the transmission information and control information) which can make time adjustments on information transfer in the self-routing speech path (SRSP) 20. Note that the first embodiment of the self-routing speech path (SRSP) 20 has already been explained with reference to FIG. 3 to FIG. 7. The second, third, fourth, and fifth embodiments of the self-routing speech path (SRSP) 20 are respectively shown in the later-mentioned FIGS. 29 and 30, FIGS. 31 to 34, FIGS. 35 to 37, and FIGS. 38 to 39.

Figure 9:
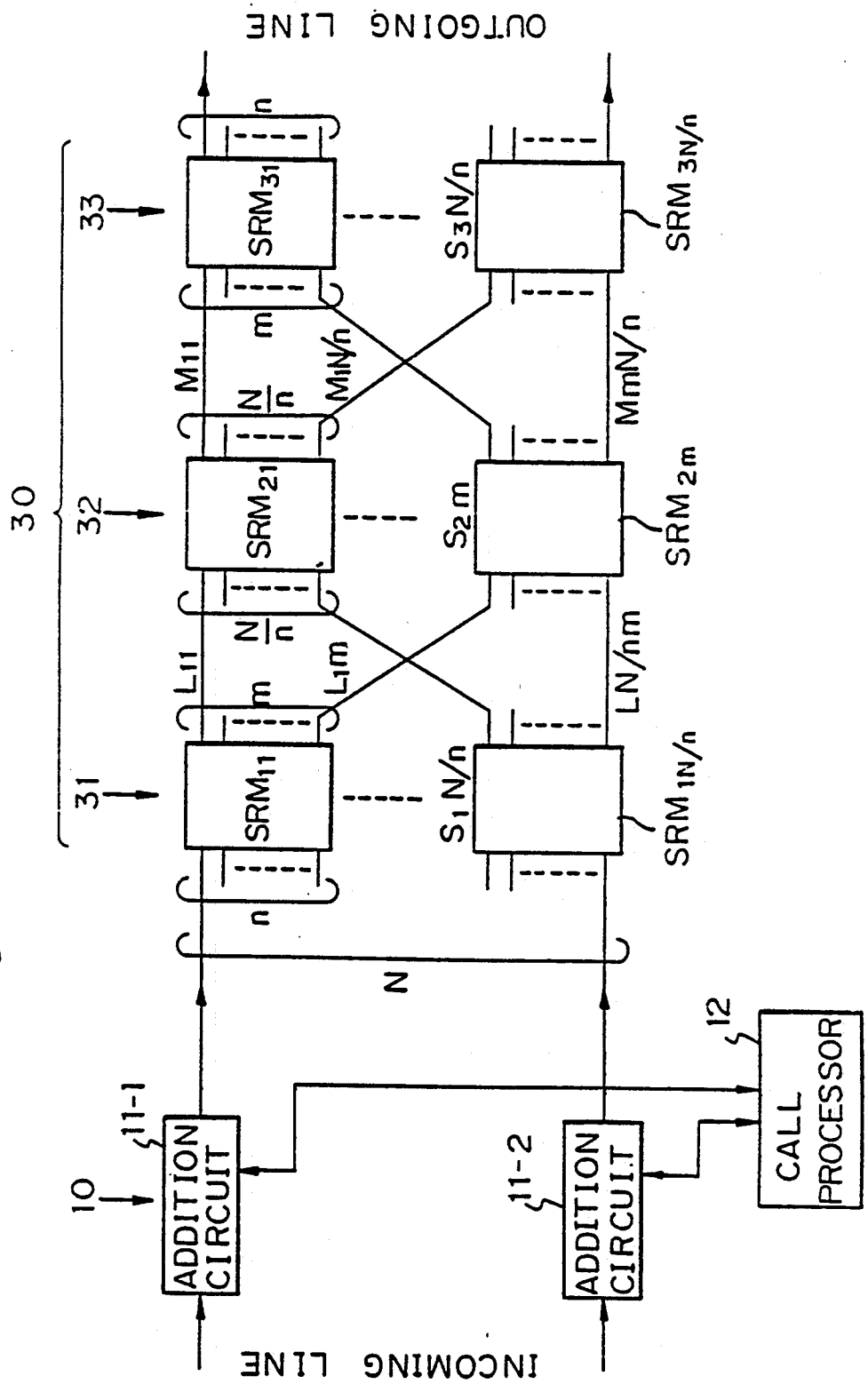
FIG. 9 is a view showing an example of the construction of a self-routing switching system of the present invention.

FIG. 9 is a view showing an example of the construction of a self-routing switching system of the present invention. In this example, use is made of the self-routing speech path (SRSP) 30 (first embodiment) as the self-routing speech path (SRSP) 20 in the system (FIG. 8a).

The control information C.INF is added by control of the call processor 12 in the control information addition circuits 11-1 to 11-N provided at the incoming line side. As explained with reference to FIG. 8B, a call processor 12 sets the correspondences between an incoming line and outgoing lines for a pair of virtual channel numbers for every incoming packet, and decides the transmission path in a self-routing speech path 30 for each virtual channel number of the incoming packets.

As mentioned with regard to FIG. 6, a transmission path is identified by control information C.INF, so that a call processor sets the correspondences between a pair of virtual channel numbers with corresponding control information C.INF to a table in each addition circuit. That is, the identification information I.INF in the headers of the input information, e.g., the virtual channel numbers (VCN), is extracted. The addition circuit searches the table with the extracted virtual channel numbers, finds the corresponding virtual channel numbers and control information and adds the found control information and virtual channel number in the addition circuits 11-1 ∼ 11-N to the input information.

Figure 10:
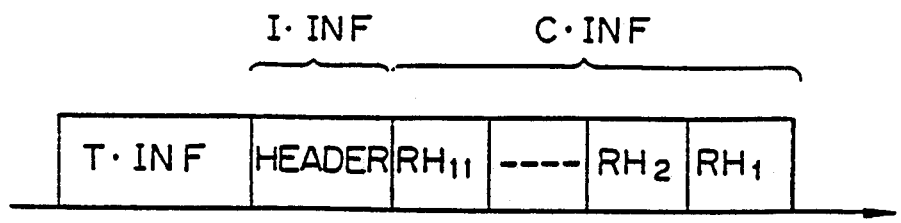
FIG. 10 is a view showing a first example of a format of information appearing at the output of the route setting means.
Figure 11:
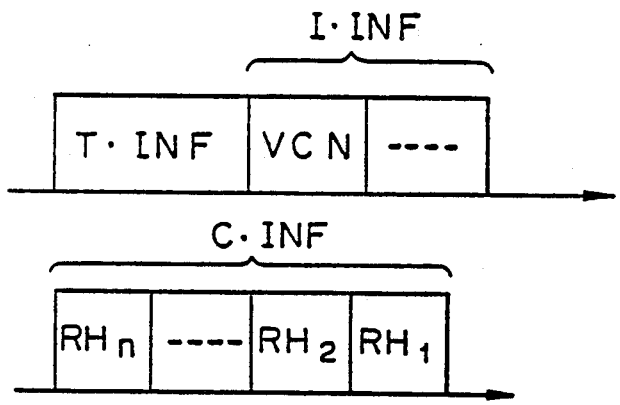
FIG. 11 is a view showing a second example of a format of information appearing at the output of the route setting means.

FIG. 10 is a view showing a first example of a format of information appearing at the output of the route setting means. FIG. 11 is a view showing a second example of a format of information appearing at the output of the route setting means. These correspond to the already mentioned FIG. 4 and FIG. 5. FIG. 10 further shows the series addition of the control information C.INF to the input information, i.e., the pairs of transmission information T.INF and identification information I.INF, while FIG. 11 shows the state of parallel addition of the C.INF to the pairs of T.INF +I.INF. Note that the I.INF of FIG. 10 and the I.INF of FIG. 11 are equivalent.

Figure 12:
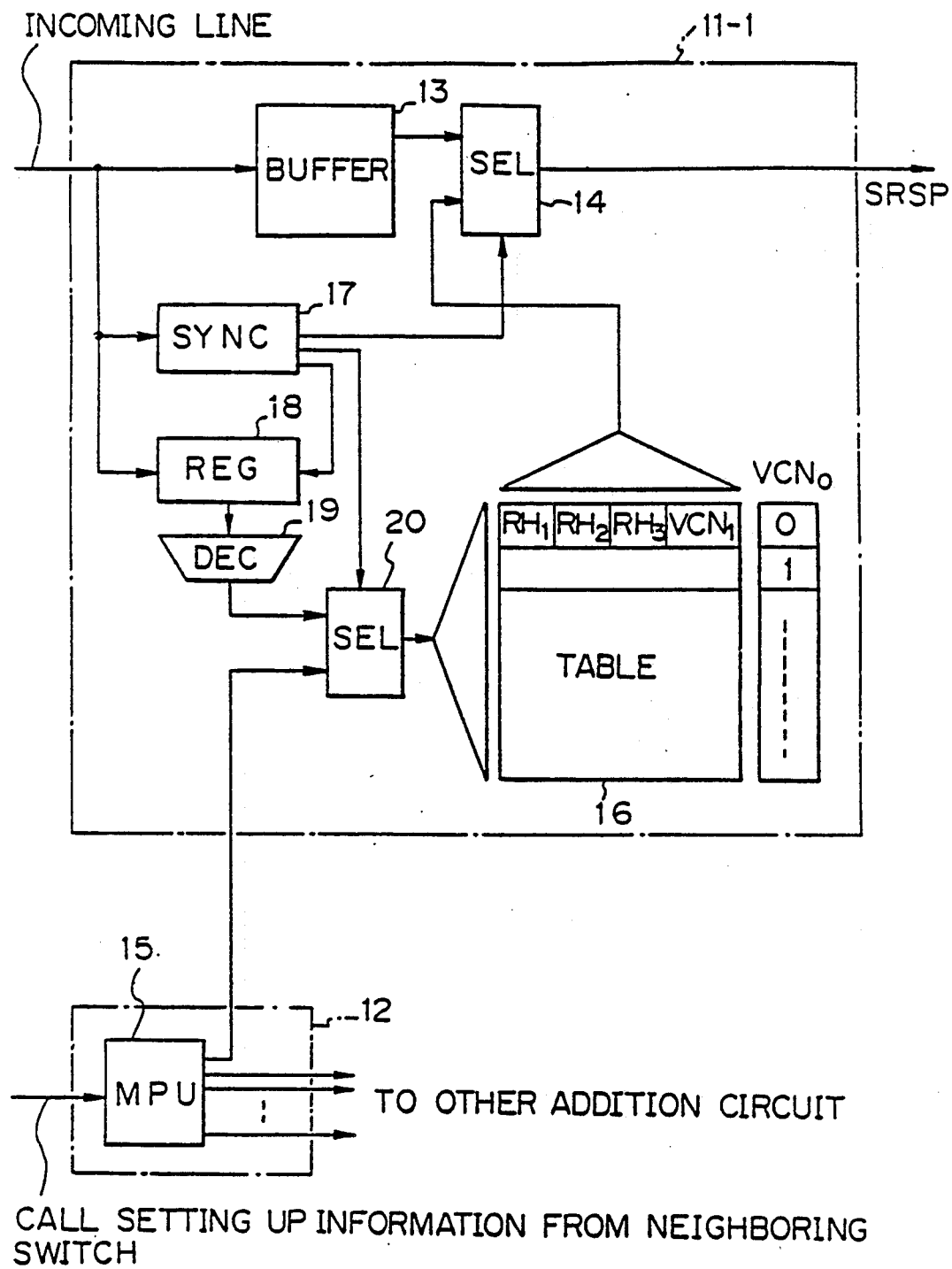
FIG. 12 is a circuit diagram showing a specific example of the route setting means.

FIG. 12 is a circuit diagram showing a specific example of the route setting means such as 10 in FIG. 8A. In the figure, an explanation is made of how control information C.INF is added by the route setting means, taking as an example the case where packet information is the input information. The calling party provides the packet information and carries out a call setting up phase for notifying the packet receiving party's to the call processor 12 before the transmission of the packet. A microprocessor (MPU) 15 of the call processor 12 sets the path of the speech path through which the packet is to pass by the notified receiving party and calling party and decides a virtual channel number for the next link. The switching information of the switch modules to which the packet is input, that is, the control information C.INF, i.e., $RH_1$, $RH_2$, and $RH_3$, and the virtual channel number for the next link are stored in the address corresponding to the identification information (VCN) which indicates the receiving party.

Next, the packet is actually transmitted in the packet transfer phase. This packet is comprised of the transmission information and the header portion consisting of the identification information ($VCN_0$) added to the header of the transmission information. The synchronizing circuit 17 synchronizes with the incoming packet for the use of a synchronizing pattern in a header portion, and controls the timing of each part. The packet which is transferred to the speech path is stored in the buffer 13 of the addition circuit 11-1, and the identification information portion I.INF is input to the decoder 19 via the register 18 under the control of the synchronizing circuit 17. When the decoder 19 receives the identification information (virtual channel number $VCN_0$) of the input packet, the table 16 is accessed using this identification information $VCN_0$ as the address. The table 16 stores therein the control information corresponding to the identification information $VCN_0$ and the identification information ($VCN_1$) identifying the packet in the next link, as mentioned earlier. To add this control information and $VCN_1$ to the packet header, the control information read out from the table 16 is sent to the selector (SEL) 14. The synchronizing circuit 17 performs switching control of the selector 14, first sends out the control information C.INF and new identification information $VCN_1$, then reads out the transmission information portion of the packet from the buffer 13 and sends it through the selector 14 to the self-rating speech path (SRSP) 30.

In the above way, the control information and the identification information of the next transmission path are added to the packet headers on the incoming line side of the speech path 30. As it is obvious from above explanation, packet transfer control is performed by hardware and not controlled by the microprocessor 15.

Figure 13:
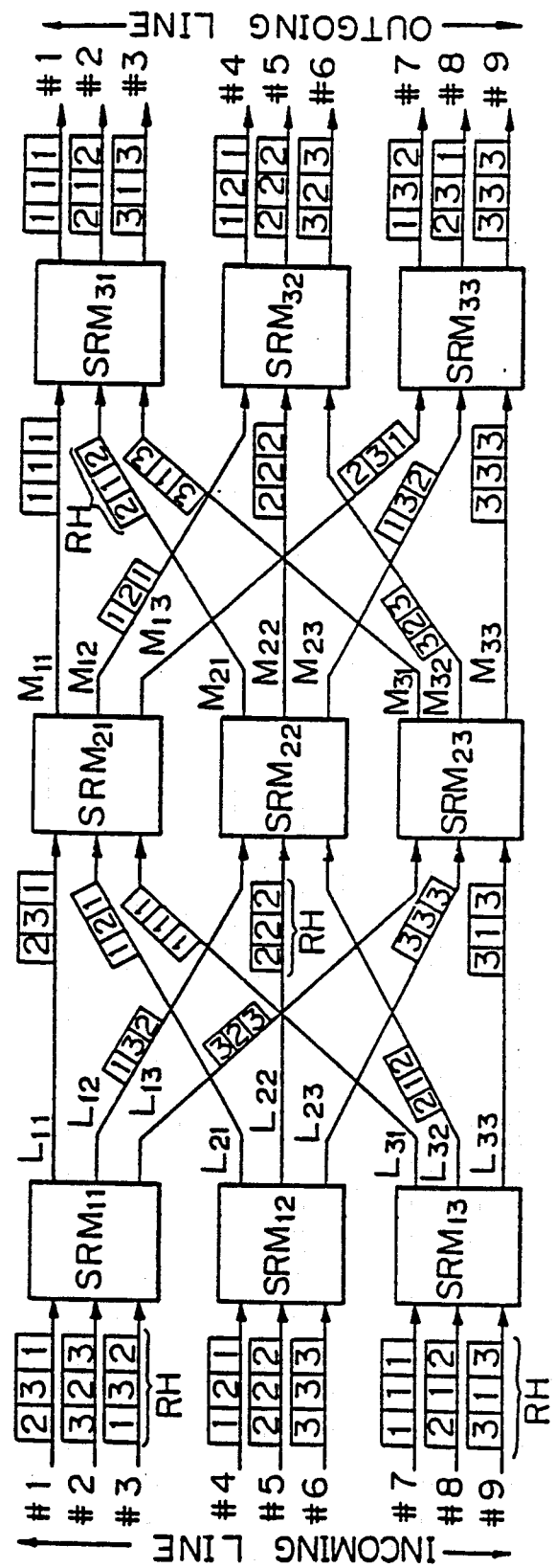
FIG. 13 is a view showing in detail the control information.

FIG. 13 is a view showing in detail the control information. It shows illustratively the selection of the different paths by the different routing headers RH.

The right block numbers of the RH's show output lines of $SRM_{11}$, $SRM_{12}$, $SRM_{13}$, the middle block numbers of the RH's show output lines of $SRM_{21}$, $SRM_{22}$, $SRM_{23}$, and the left block numbers of the RH's show output lines of $SRM_{31}$, $SRM_{32}$, $SRM_{33}$.

That is, each block number corresponds to the right sub-index of line symbols such as $L_{11}$, $L_{12}$, $L_{13}$, ... , $M_{11}$, ...

As already explained, the self-routing switching system of the present invention can much more easily be expanded in scale compared to the conventional Banyan type speech path. The major portion of the expansion of scale of a switching system consists of expansion of scale of the speech path, so being able to easily perform expansion of the scale of the speech path is very advantageous. When performing expansion of the scale of a Banyan type speech path, it is necessary to stop the operation of the speech path once and then rewire. It is impossible to perform the expansion of the speech path with the speech path still in the active state. Therefore, the communication service drops when expanding the speech path.

Figure 14:
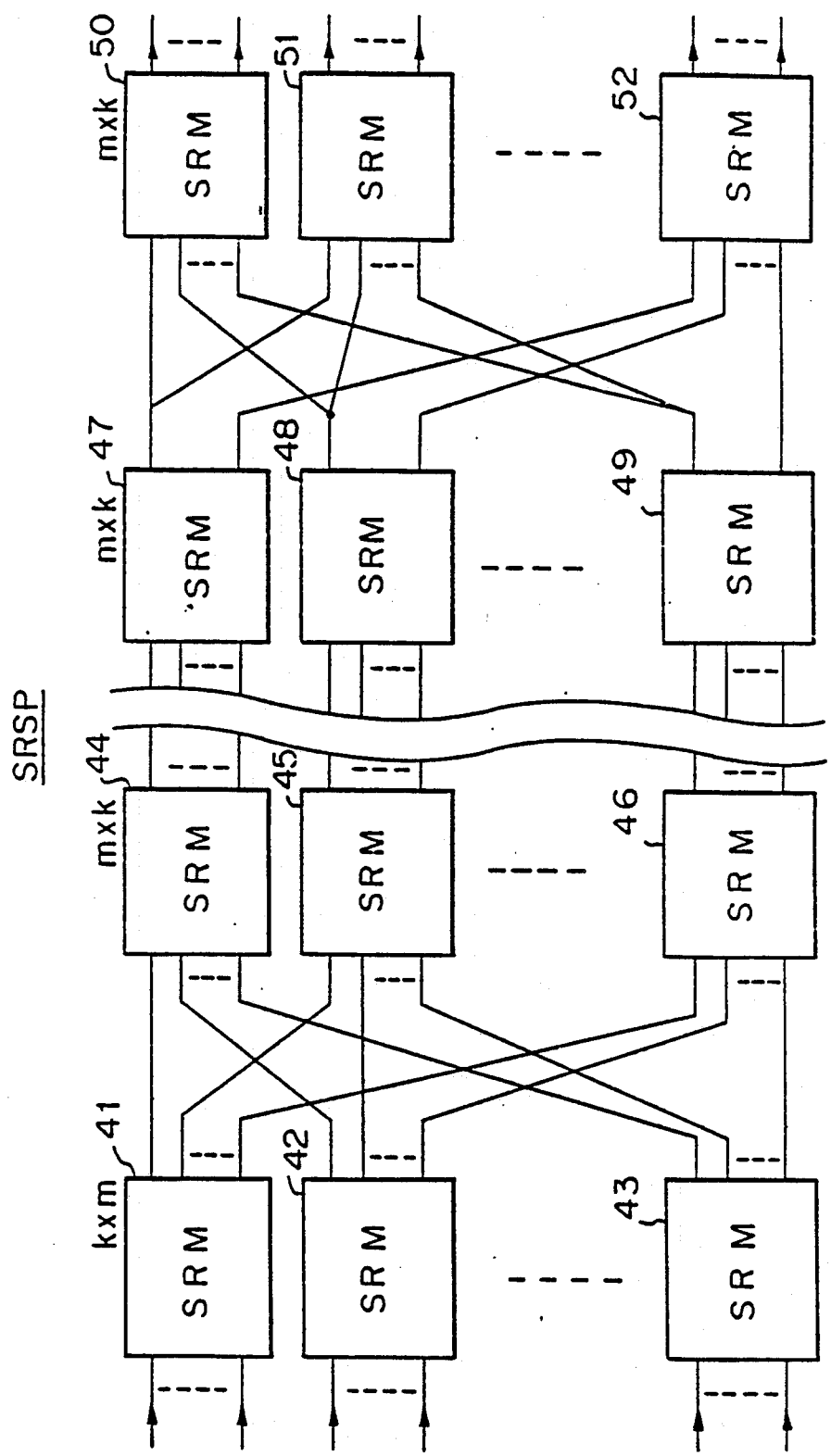
FIG. 14 is a wiring diagram showing a self-routing speech path expanded in scale based on the present invention.

FIG. 14 is a wiring diagram showing a self-routing speech path expanded in scale without increasing the switching stages. When scheduling to expand the scale in the future, the self-routing speech path (SRSP) is constructed by multiple link connection of two types of self-routing switch modules (SRM) 41 to 52 with differing numbers of input ends and output ends. By a one-versus-many link connection of the self-routing switch modules SRM to all the self-routing switch modules SRM of the later stages, provision is made of a method of constructing a self-routing speech path which enables expansion of the scale of the speech path with the speech path (SRSP) still operating and without change of the number of link stages.

By forming a speech path through multiple link connection of two types of self-routing switch modules 41 to 52 with different numbers of input and output ends and one-versus-many connection of each of the self-routing switch modules of each stage to all of the selfrouting switch modules of the later stages, there is no increase of link stages even upon expansion of the scale of the speech path, so it is possible to expand the scale with the speech path still operation.

In FIG. 14, k×m and m×k means that there are two types of SRM's with different numbers of input ends and output ends.

Figure 15:
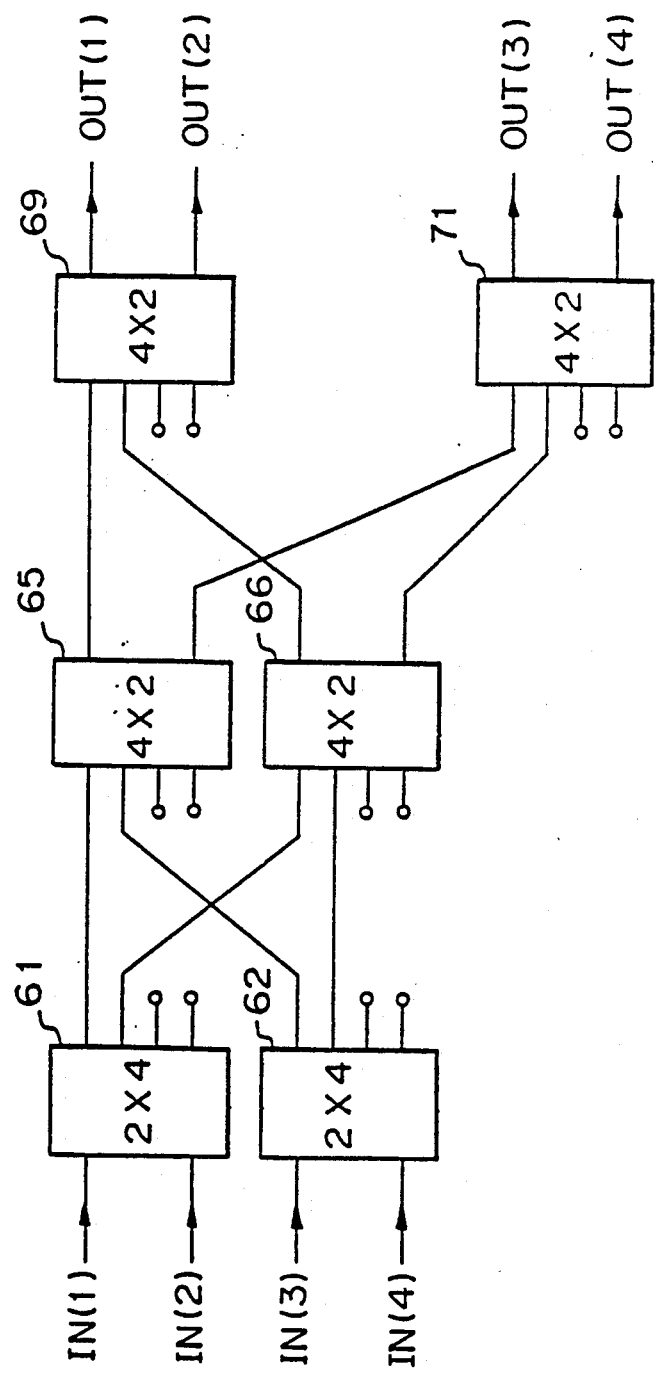
FIG. 15 is a wiring diagram showing an example of a 4×4 self-routing speech path of the present invention before expansion of scale.

FIG. 15 is a wiring diagram showing an example of a 4×4 self-routing speech path of the present invention before expansion of scale. In the figure, reference numerals 61 and 62 are self-routing switch modules SRM with 2×4 input and output ends, and reference numerals 65, 66, 69, and 71 are self-routing switch modules with 4×2 input and output ends. The selfrouting speech path (SRSP) has self-routing switch modules connected by a three-stage link. The individual self-routing switch modules operate equivalently to 2×2 modules before expansion of the scale.

Figure 16:
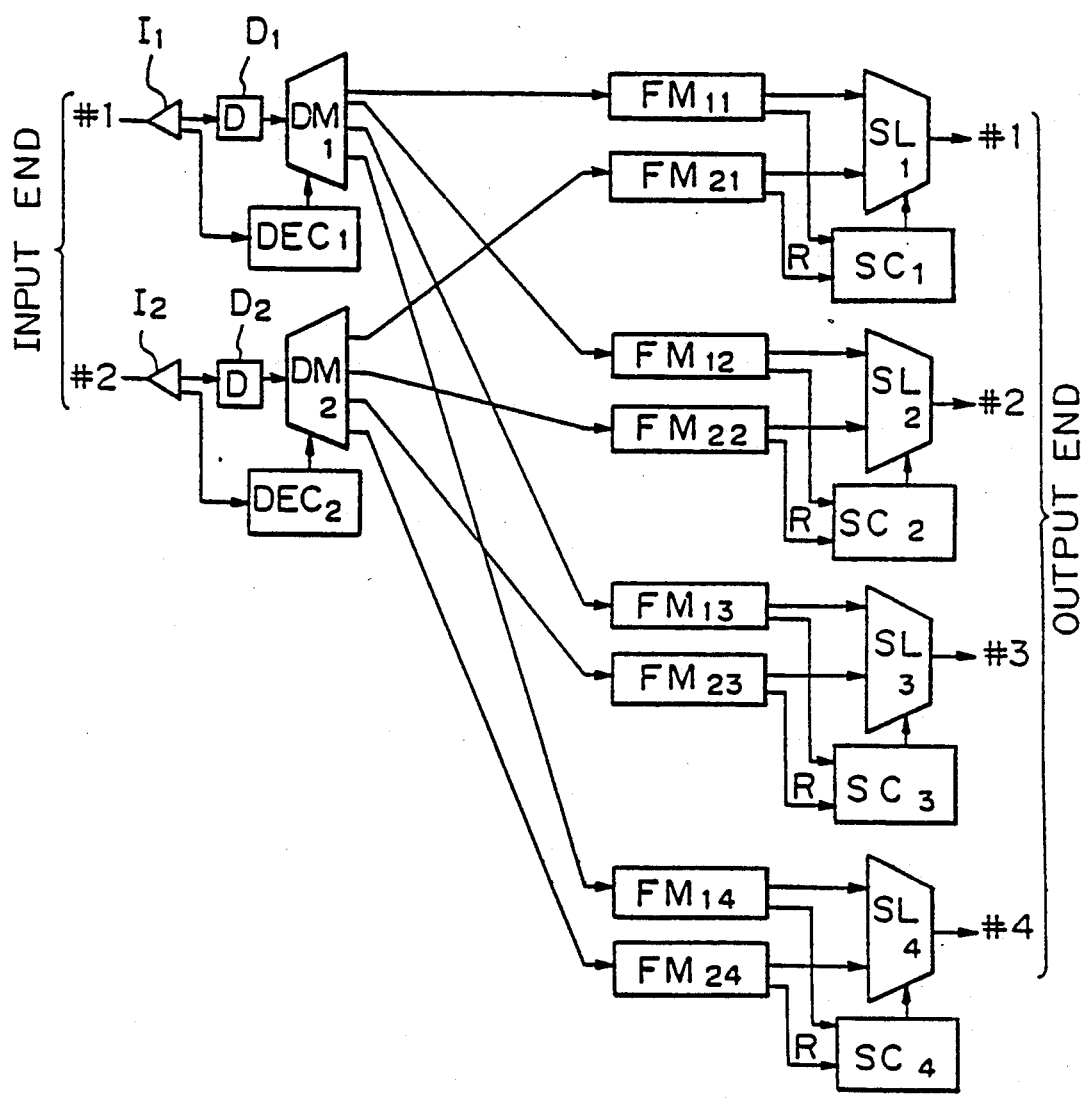
FIG. 16 is a circuit diagram showing an example of the construction of the 2×4 self-routing switch module in FIG. 15.
Figure 17:
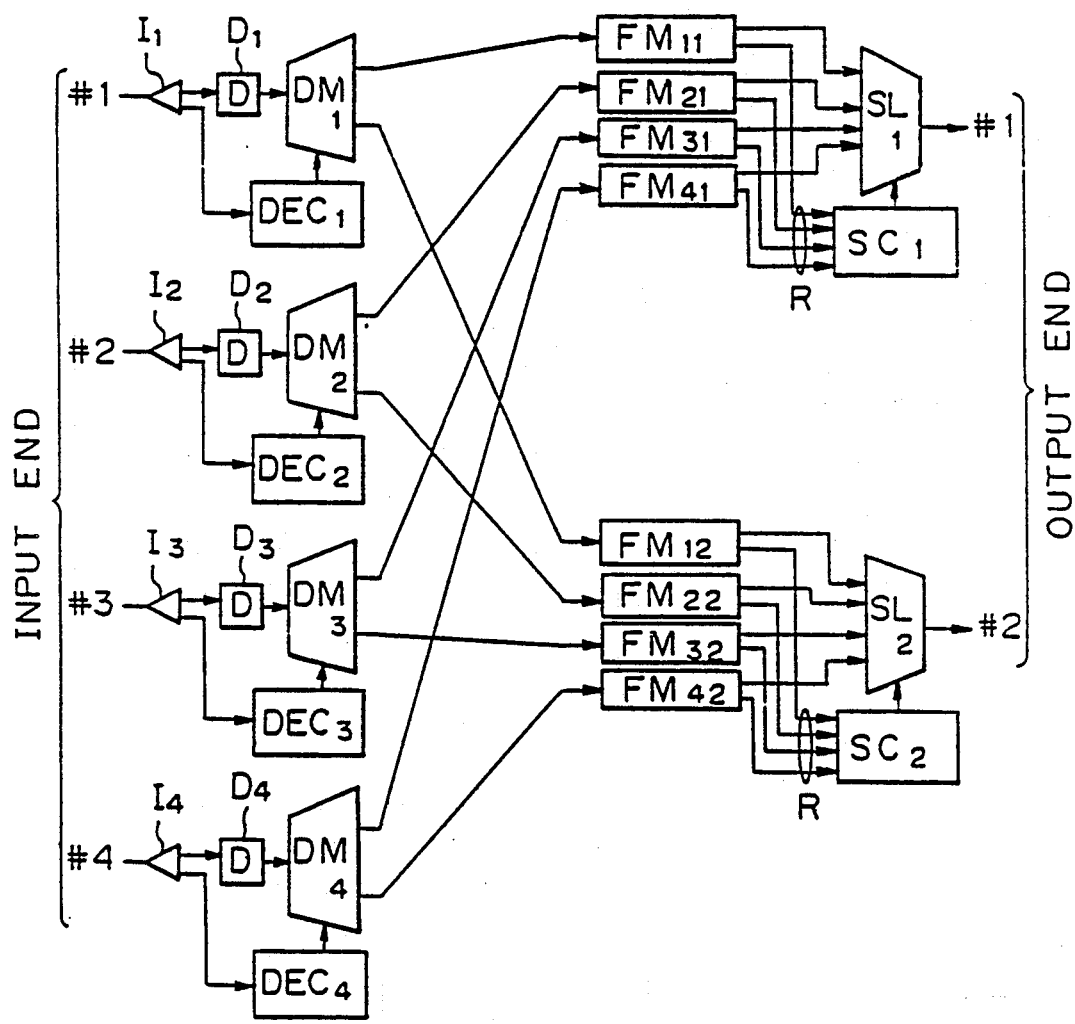
FIG. 17 is a circuit diagram showing an example of the construction of the 4×2 self-routing switch module in FIG. 15.

FIG. 16 is a circuit diagram showing an example of the construction of the 2×4 self-routing switch modules in FIG. 15. FIG. 17 is a circuit diagram showing an example of the construction of the 4×2 self-routing switch modules in FIG. 15. The construction of FIG. 16 and the construction of FIG. 17 are basically the same as the construction of the afore-mentioned FIG. 7. The only difference is that there is an imbalance in the number of input ends and the number of output ends. Therefore, explanation of the function is omitted.

Figure 18:
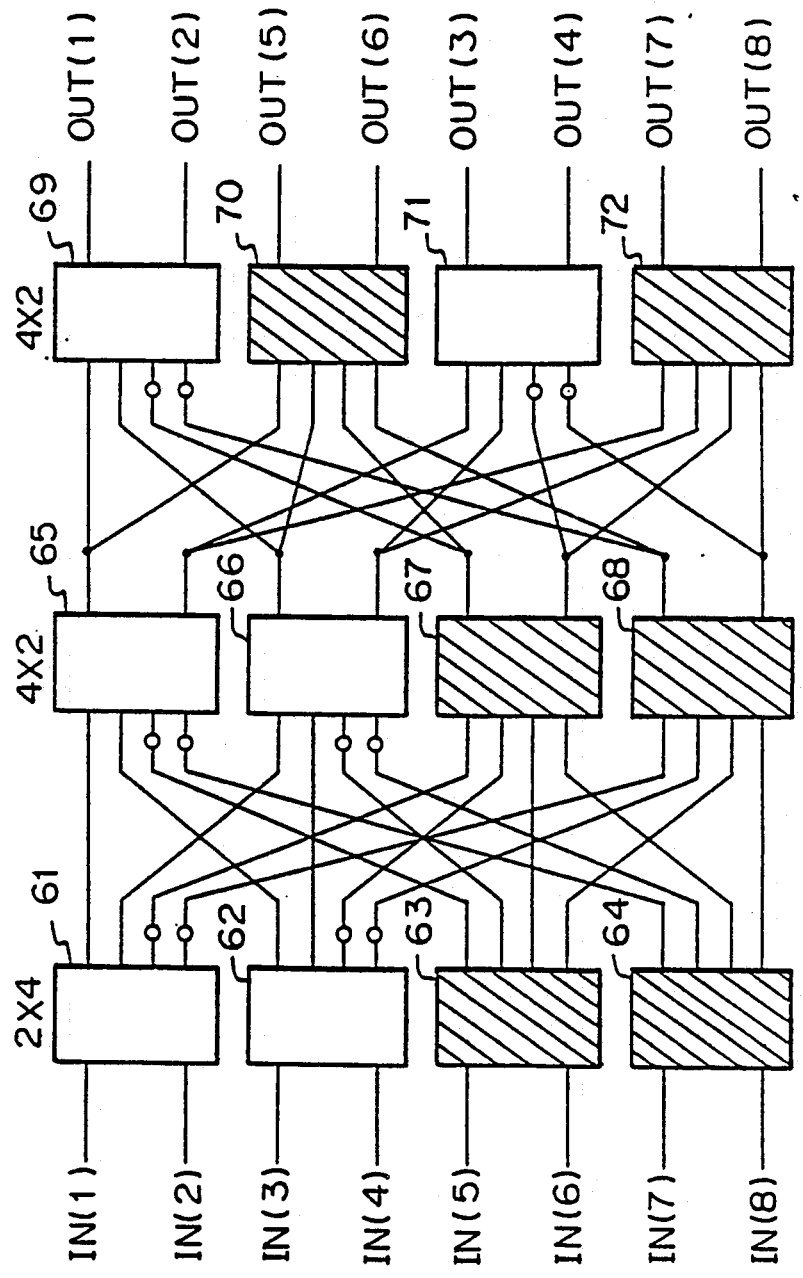
FIG. 18 is a wiring diagram showing a self-routing speech path after the expansion in scale of the self-routing speech path of FIG. 15.

FIG. 18 is a wiring diagram showing a self-routing speech path after the expansion in scale of the self-routing speech path of FIG. 15. More specifically, it shows an example of the expansion of scale of a 4×4 self-routing speech path (SRSP) to an 8×8 speech path (SRSP). The hatched blocks in the figure are newly added self-routing switch modules. The modules 63 and 64 have 2×4 input and output ends, while the modules 67, 68, 70, and 72 have 4×2 input and output ends.

In this way, there is no increase in the number of link connection stages. Two modules each are added at each stage. In the link connection between the input stage and middle stage, the four output ends of the input stage modules are connected to the idle ends of the modules, e.g., all the input ends of the modules 65 to 68 of the middle stage. Further, in the link connection between the middle stage and output stage, the two output ends of the modules of the middle stage are multiplex connected to the input ends of the existing modules 69 and 71 and newly added modules 70 and 72 of the output stage.

As a result of this multiplex connection, the packet sent from a module of the middle stage to modules of the output stage is also sent to the modules other than the module corresponding to the packet destination. In such modules, the routing header RH of the packet is analyzed at the control information decoder circuit DEC, so there is no mistaken output of the packet to those output ends.

In the working of the present invention, various modifications are possible. For example, the selfrouting switch modules used are not limited to 2×4 or 4×2 ones. It is sufficient that there be two types of modules with differing numbers of input ends and output ends. Further, the number of incoming lines and outgoing lines of the expanded self-routing speech path is not limited to 8×8, of course. The number of connection stages of the self-routing speech path is determined by the relationship between the number of incoming lines and outgoing lines and is not limited to the illustrated three stages.

Therefore, it is possible to change the number of input and output ends of a self-routing speech path without changing the number of its link connection stages, so it is possible to expand the scale while the self-routing speech path is operating, thus preventing a decline in communication service due to cessation of operation during speech path scale expansion.

Referring to FIG. 14 to FIG. 18, it was explained that expansion of scale of the self-routing switching system according to the present invention was easy, however, in addition to this, it is also possible to expand various service functions. However, some measures are needed to expand the service functions. These measures will be explained here. First, in the self-routing switching system shown in FIG. 9, when providing a subscriber with a particular service, such as error control, as an optional function, it is necessary to add in advance to a self-routing switch module SRM itself the function of performing the particular service using hardware If no measure is taken at all, the amount of hardware of the switch modules would increase and the switching system as a whole would become large scale and uneconomical as an apparatus.

Further, when further adding various services, the switching modules must be changed, so it becomes impossible to flexibly deal with increases in services.

On the other hand, in the CCITT recommendation X.25 base packet switching, use is made of the system of processing the packets completely by software, but strict provisions are made on error control etc., so the processing delay becomes large. Therefore, in packet processing, it is preferable to process by hardware as much as possible and further it is desirable to simplify the protocol.

Therefore, measures have been taken with respect to the self-routing switching system of FIG. 9 to realize a self-routing switching system which can flexibly deal with optional services simply and with a small amount of hardware.

Figure 19:
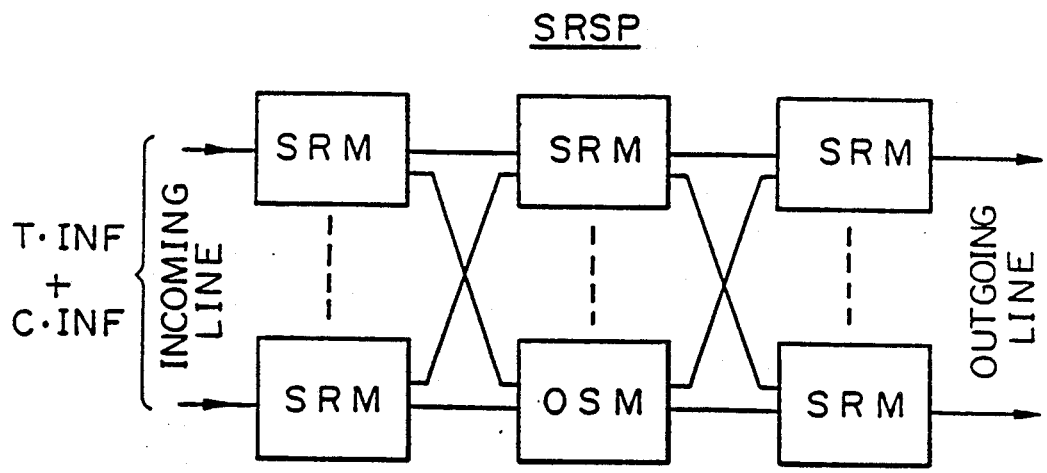
FIG. 19 is a concept view of a self-routing switching system able to supply specific services as optional functions.

FIG. 19 is a concept view of a self-routing switching system able to supply particular services as optional functions. In the figure, the self-routing modules SRM autonomously perform a switching operation of the control information C.INF added to the transmission information T.INF and send it to the outgoing line specified by the control information. The control; information C.INF includes an optional service demand (OSM). OSM is a predetermined module out of the modules SRM which is given optional service functions and is provided in parallel with the modules of the middle stage of the modules SRM.

In the self-routing switching system shown in FIG. 19, the input information header includes commands that particular optional services are to be performed. Based on this, a routing header RH is given and a decision is made on a path toward the optional service module OSM. The information sent from a module SRM at the input stage to the module OSM at the middle stage is sent to a switch module SRM of the output stage after the error control or other optional service is performed and the routing header replaced.

FIG. 20A and 20B are circuit diagram of a self-routing switching system showing details, in particular, of the portion of the optional service module of FIG. 19. FIG. 20 shows the arrangement of FIGS. 20A and 20B. Portions other than the optional service modules are the same in construction as in FIG. 9. In this switching system, for example, a predetermined single switch module $SRM_{2m}$ located at the middle stage of the self-routing switch modules SRM of the self-routing switching system shown in FIG. 9 is changed to an optional service module OSM. In this change, one each of the output ends of the input stage switch modules $SRM_{11}$ to $SRM_{1N/n}$ are connected to the input ends of the optional service module OSM (FIG. 20B) and the output ends of the optional service module OSM are connected to one each of the input ends of the modules $SRM_{31}$ to $SRM_{3N/n}$.

In this optional service module OSM, FIFO memories 81 function transmission information buffers. The information stored in the FIFO memories 81 is operated on by a processor (CPU) 82 that executes a predetermined service function set in an optional service (OS)

unit 83, constructed as firmware. The processor sends the results to the selector (SEL) 84 and enables the optional service unit 83 to give a selection signal to the selector (SEL) 84 so as to select the path of the information packet by the routing header RH and to store the transmission information in the FIFO memory 85 corresponding to the predetermined path. Note that the FIFO memories in the figure are drawn schematically, but are exactly the same as the FIFO memories of other figures.

Next, an explanation will be made of the case of execution of an optional service. When setting up an optional service demand for, e.g., a cyclic redundancy check (CRC) code error control or flow control, in a subscriber side terminal equipment (not shown), the call processor 12 sets a routing header RH to the optional service module OSM in the addition circuit (11) (FIG. 20A) connected to the terminal equipment. The routing header rit is based on the virtual channel number (VCN) in the identification information received. The addition circuit (11) adds the routing header information and optional service demand to the transmission information packet, and sends the result to switch module $SRM_{11}$, for example, at the input stage. At the module $SRM_{11}$, the optional service module OSM is selected from the routing header as the module of the middle stage.

In this way, by the routing header, the information packet from the terminal equipment which generated the optional service demand is, at the optional service module OSM, then stored in the FIFO memory 81, then passed through the processor 82 and, at the optional service unit 83, used for execution of, for example, the CRC code error check. Next, according to the results, the selector (SEL) 84 is controlled and the transmission information packet is stored in one of the FIFO memories 85. In the same way as the case of FIG. 9, it is then transmitted from the output end of the module OSM to an output stage module SRM.

Figure 21:
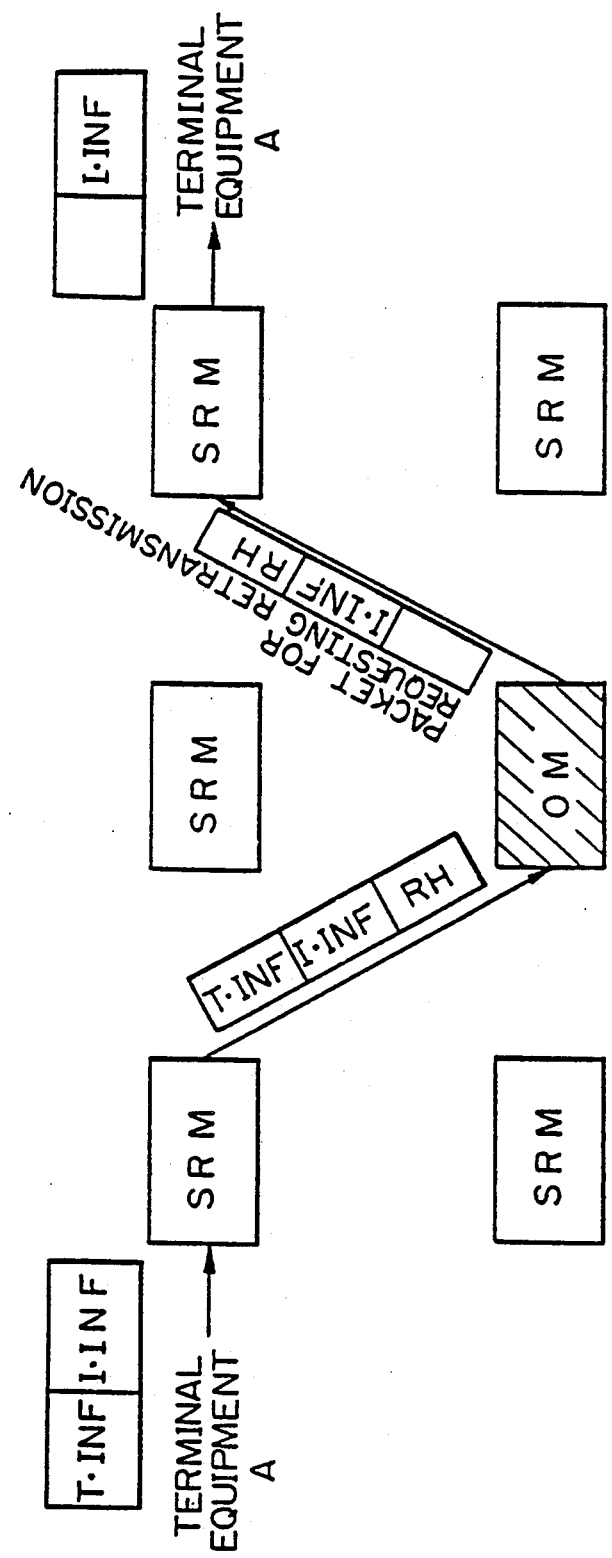
FIG. 21 is a signal flowchart showing the flow of input information upon detection of error in FIG. 19.
Figure 22:
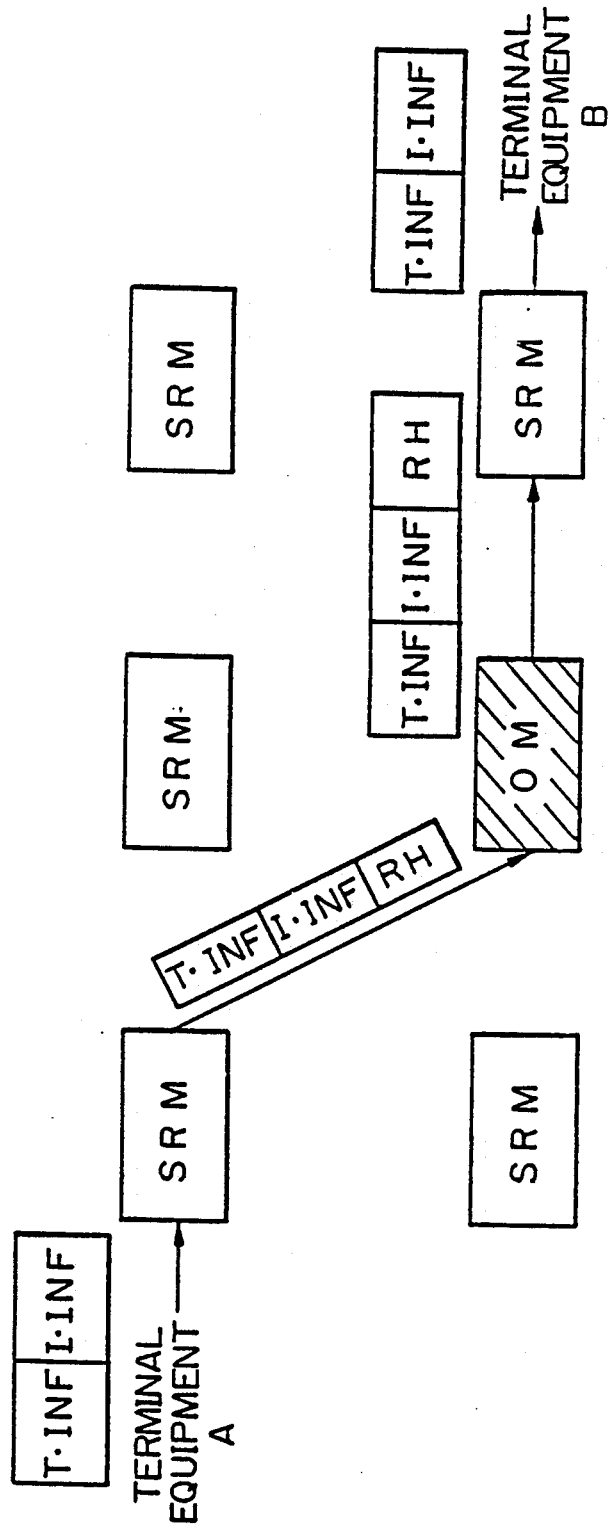
FIG. 22 is a signal flowchart showing the flow of input information upon no detection of error in FIG. 19.
Figure 23:
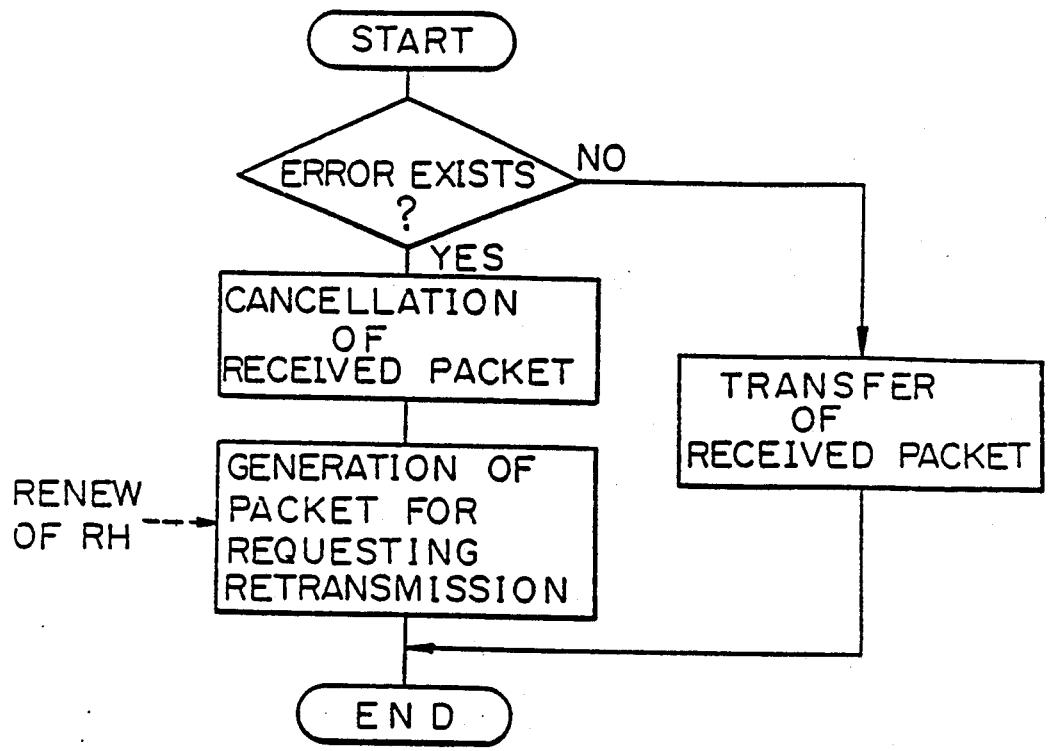
FIG. 23 is a flowchart showing the operation of FIG. 21 and FIG. 22.

FIG. 21 is a signal flowchart showing the flow of input information upon detection of error in FIG. 19. FIG. 22 is a signal flowchart showing the flow of input information upon no detection of error in FIG. 19. When an error is detected at the optional service module OSM, as shown in FIG. 21, the information packet is discarded, a packet for requesting retransmission is formed, the routing header is changed, the packet returned through the output stage module to the terminal equipment which set up the call, and retransmission requested. On the other hand, when no error is detected, as shown in FIG. 22, information transfer is performed to the terminal equipment on the receiving side. FIG. 23 is a flowchart showing the operation of FIG. 21 and FIG. 22.

Figure 24:
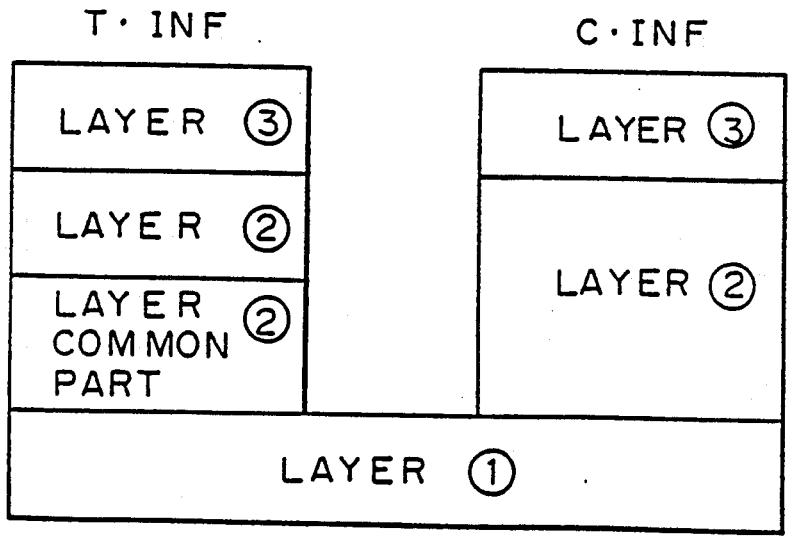
FIG. 24 is a view showing an example of the protocol construction of error control.

FIG. 24 is a view showing an example of the protocol construction of error control. At layer ①, hardware interface is performed for transmitting and receiving information. At layer ②, packet sequential control etc. is performed and, at C.INF layer ③, an optional service demand etc. is made. Further, at the common part of layer ② of the transmission information T.INF, packet identification and other packet control is performed, while at the option part of the T.INF layer ②, the sequence of the option control is set. Further, the layer ③ of T.INF has set therein procedures for special control of calls.

In addition to this CRC code check, it is of course possible to set error control or other optional services in advance in the optional service module OSM.

Figure 25:
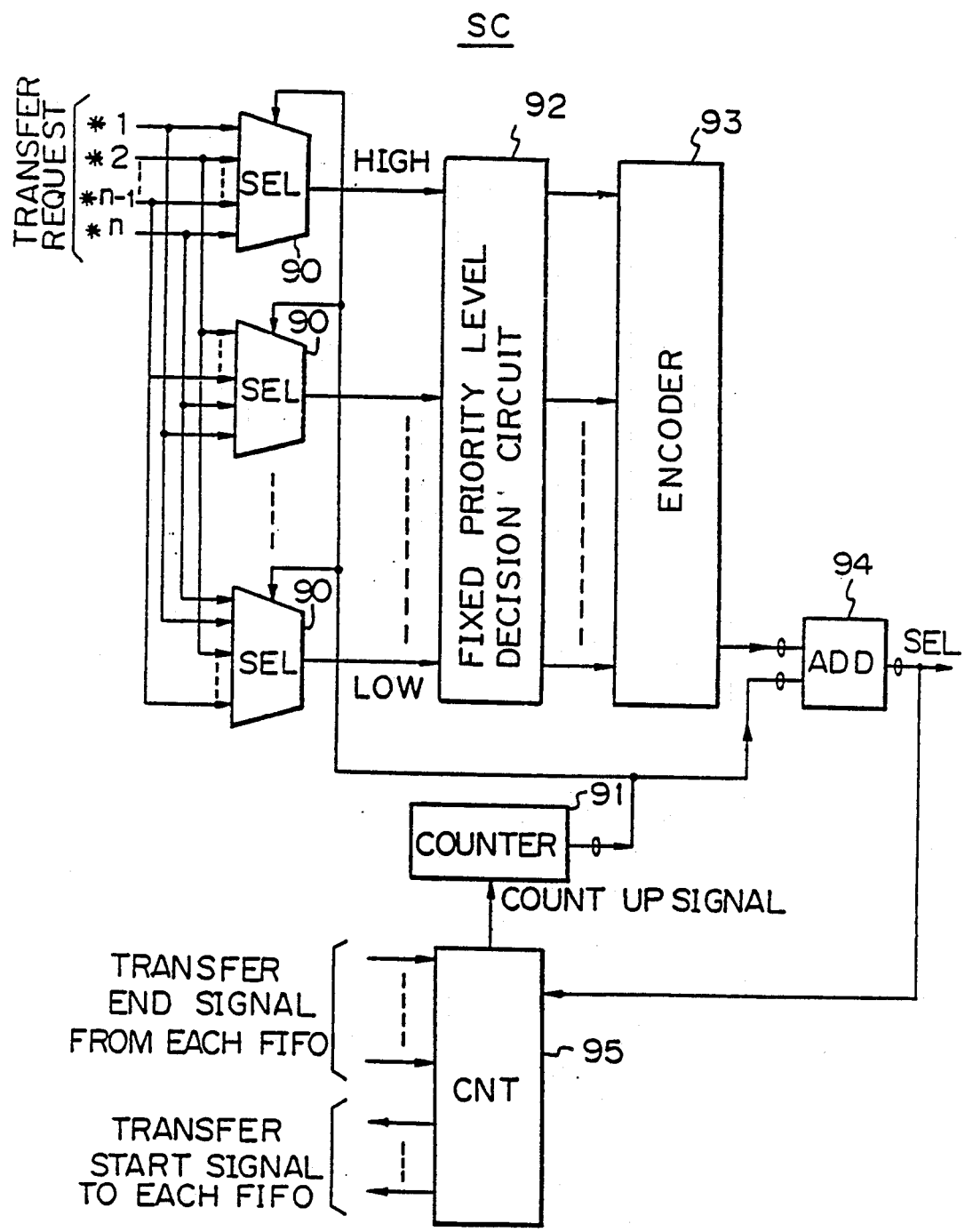
FIG. 25 is a circuit diagram showing a specific example of the selector control circuit in FIG. 20.

FIG. 25 is a circuit diagram showing a specific example of the selector control circuit in FIG. 20. In FIG. 25, the transfer requests (*1, *2, . . . *n−1, *n) from the FIFO memories 85 are shifted one by one and input to the individual selectors (SEL) 90. Based on the commanded value from a counter 91, they are sent through the fixed priority level decision circuit 92 and encoder 93 to the adder (ADD) 94. The adder 94 adds the commanded value of the counter Al and the transfer request number (*1, *2, . . . *n−1, *n) shown by the output of the encoder 93 and issues the corresponding FIFO memory number and sends it to the selector (SEL) 86 of FIG. 20. The commanded value to the selector (SEL) 86 is returned to the controller (CNT) 95 and a transfer acknowledge (ACK) signal sent to the FIFO memory 85 producing the transfer request. When a signal for which transfer is completed is received from the FIFO memory 85, a signal is sent to the counter 91 to raise the count of the counter 91. By this, the selection signal of the selector 90 is raised, for example, by "1".

In this case, when there are two or more transfer requests at the same time, the fixed priority level decision circuit 92 sends transfer request signals to the encoder 93 by a predetermined priority order (for example, the order from the top of the illustration).

In this way, a plurality of self-routing modules SRM are autonomously switched and information packets sent.

Therefore, according to self-routing switching system of FIG. 20, the optional service module for executing optional services replaces a predetermined module of the middle stage in the self-routing switching system of FIG. 9. The optional service module is made exclusive for optional services, so it is possible to flexibly add optional services without changing the construction of the overall switching system and to simplify the hardware construction and protocol.

To make the self-routing switching system of the present invention shown in FIG. 9 operate at a higher efficiency, it is desirable to be able to perform the information transfer in accordance with the attributes of the information and state of congestion of the input information. That is, unless some measures are taken with regard to the switching system of FIG. 9, the following two disadvantages exist.

First, since all information is handled uniformly without consideration of its attributes, priority is not given to processing of data requiring real time processing (for example, voice and video information) and thus a time delay occurs through the self-routing switch modules SRM in the switching apparatus.

Second, traffic imbalances result in overload states of information transfer. When it is required to control this, the routing headers RH are rewritten, but in this case if the same call information is held waiting in another buffer FM, reversal (overtaking) of the transfer order of information will occur.

Figure 26:
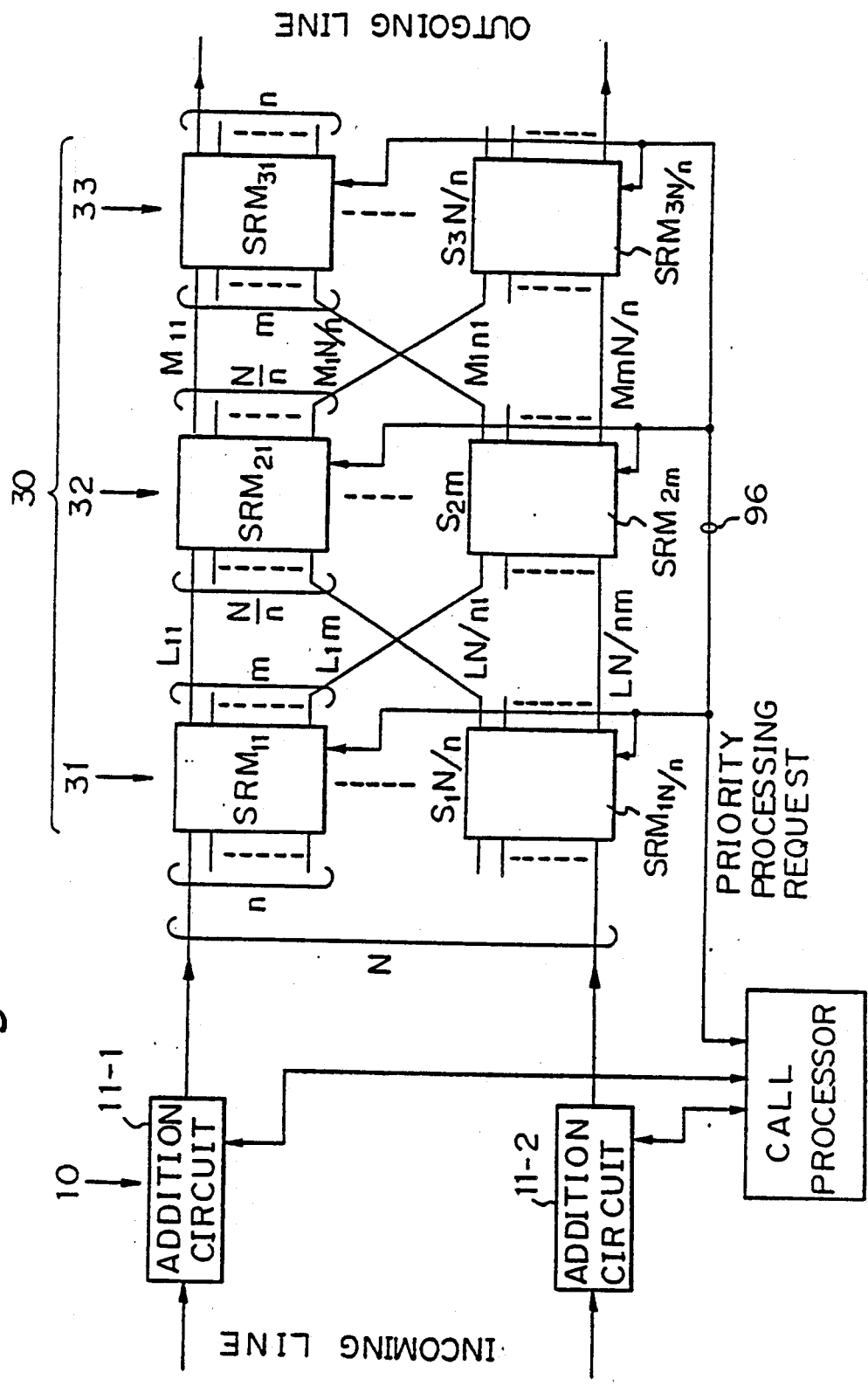
FIG. 26 is a concept view of a self-routing switching system able to perform priority processing.

FIG. 26 is a concept view of a self-routing switching system able to perform priority processing.

When the self-routing switch modules $SRM_{11}$ to $SRM_{3N/n}$ receive priority processing requests from the call processor 12, the input information of the incoming line requiring the priority processing is selected and sent on a priority basis.

Therefore, when setting up a call, if the attributes of the information are those requiring priority processing (voice, video, etc.), priority processing is allocated to the modules $SRM_{11}$ to $SRM_{3N/n}$ from the call processor 12. Further, by making it possible to detect the overload state of input information in the modules $SRM_{11}$ to $SRM_{3N/n}$, the call processor 12 can allocate priority processing to the modules $SRM_{11}$ to $SRM_{3N/n}$ to avoid congestion of information.

Figure 27:
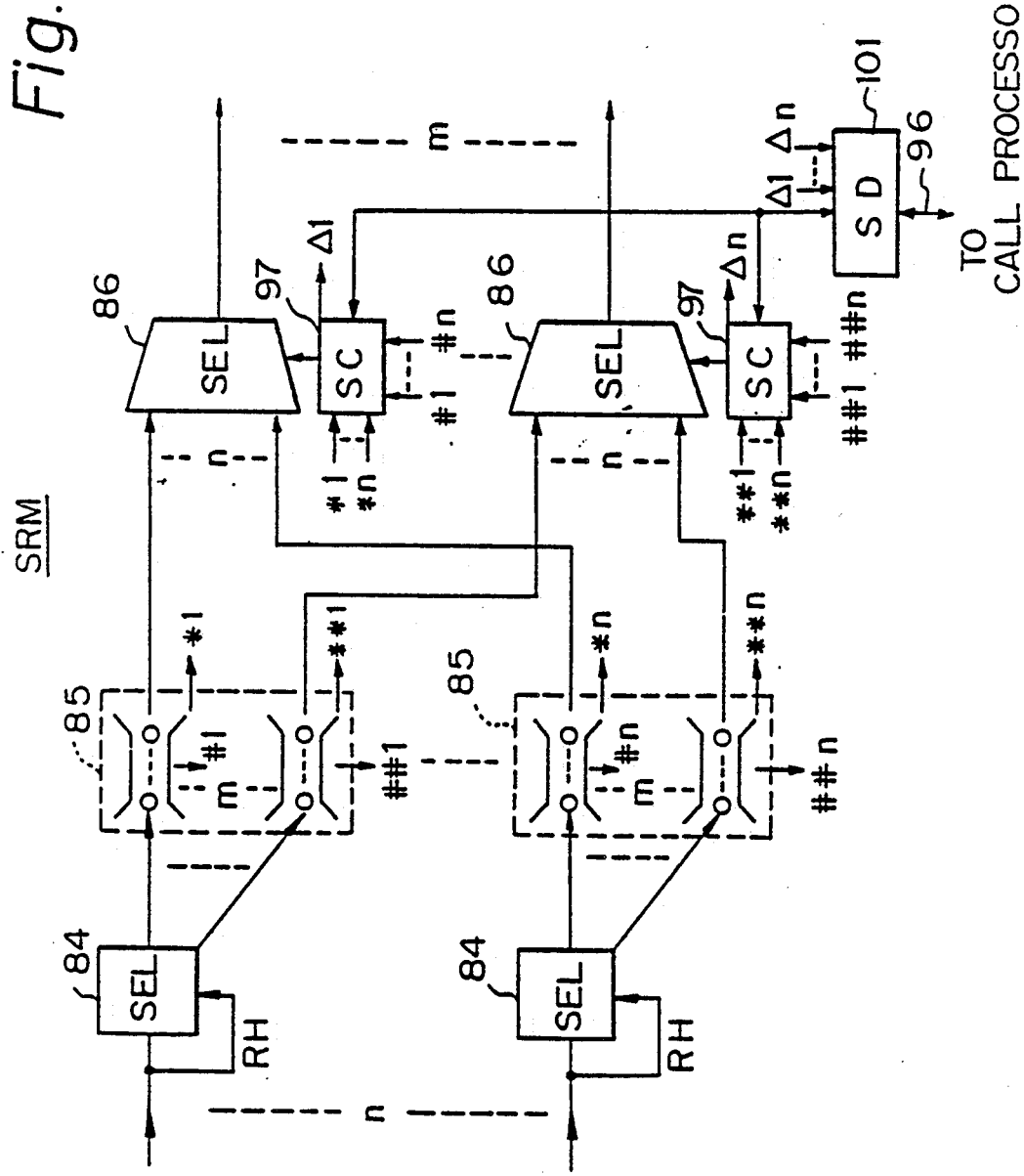
FIG. 27 is a circuit diagram showing a specific example of a self-routing switch module for performing the priority processing.

FIG. 27 is a circuit diagram showing a specific example of a self-routing switch module for performing the priority processing. This module SRM is shown as having a similar construction to the module OSM shown in FIG. 20, but basically it is completely equivalent to the module SRM of FIG. 7 and the modules SRM's of FIG. 16 and 17. In FIG. 27, the self-routing switch module SRM is provided with a signal distributor SD which transmits and receives signals with respect to the microprocessor (MPU) 15 (FIG. 12) of the call processor 12 via a control bus 96. Further, the selector control circuits (SC) 97 have a somewhat different construction from the circuit SC shown in FIG. 7. Note that as a specific example of the circuit SC of FIG. 7, it is possible to use the circuit SC shown in FIG. 25.

Figure 28:
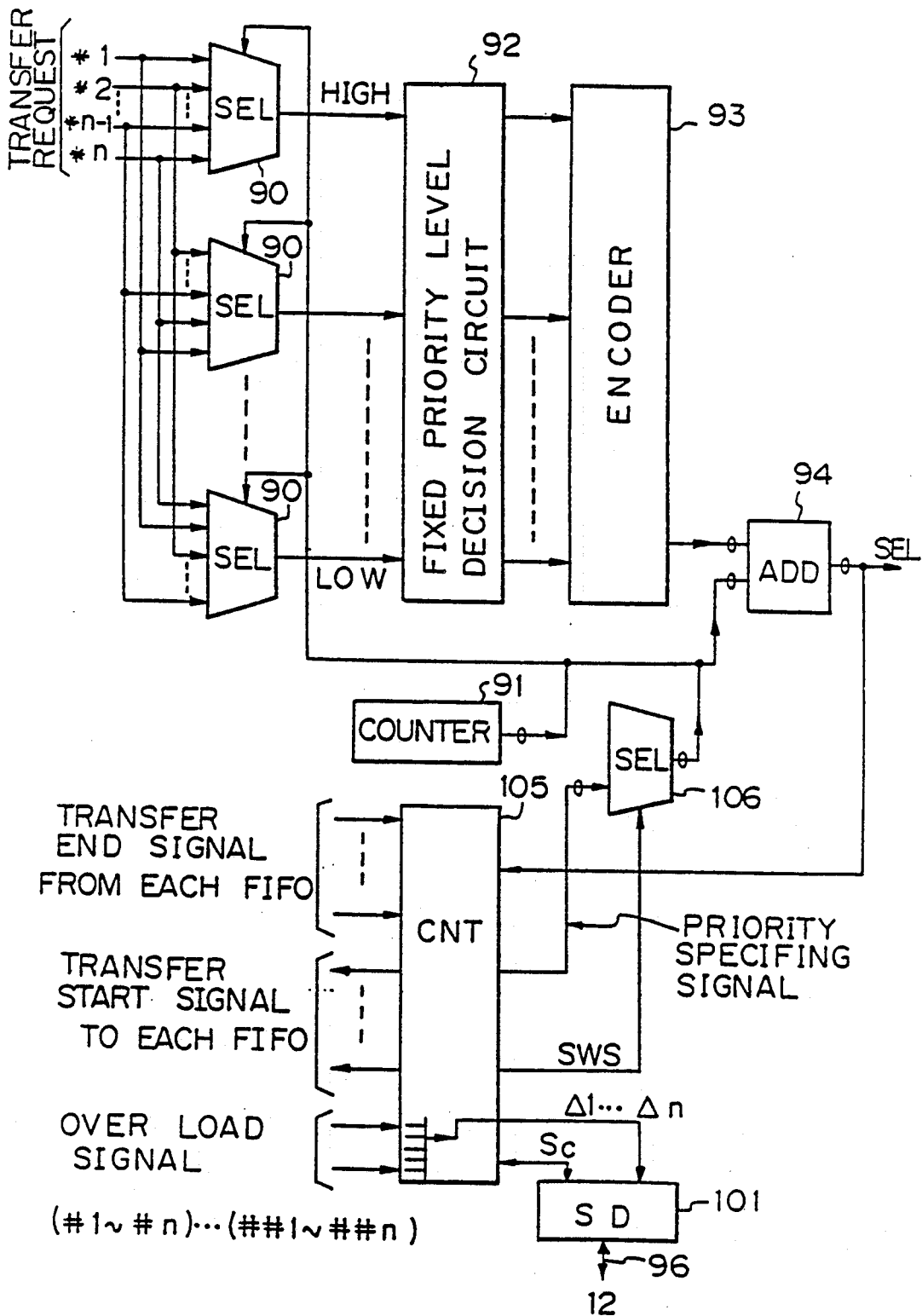
FIG. 28 is a view showing an example of a circuit of the selector control circuit for performing the priority processing.

FIG. 28 is a view showing an example of a circuit of the selector control circuit for performing the priority processing. The selector control circuit of FIG. 25 is additionally given some circuits for priority processing. In FIG. 28, the controller (CNT) 105 continuously monitors the state of information storage of the FIFO memories 85 of FIG. 27 and reports its monitoring signals through the signal distributor (SD) 101 to the microprocessor (MPU) 15 (FIG. 12). That is, instead of the monitoring signals being sent directly to the microprocessor (MPU) 15, they are assembled by the signal distributor (SD) 101 as master information and then sent to the microprocessor (MPU) with signal distribution control performed. Further, the controller 105 sends to the selector (SEL) 106 on a priority basis the information of the predetermined FIFO memory 85 upon command from the microprocessor (MPU). The selector 106 selects one of the priority information by command of the microprocessor (MPU) or output of the counter 91. Other constructions are the same as in FIG. 25.

Next, an explanation will be given of the operation of priority processing according to the attributes of information with reference to FIG. 26 to FIG. 28. First, the microprocessor (MPU) 15 determines the priority transfer path in advance and sets the priority information in the modules SRM. As one example, priority information is set for priority processing of the information from module $SRM_{21}$ out of the modules $SRM_{31}$ to $SRM_{3N/n}$.

Next, when setting up a call, based on the virtual channel number (VCN) in the identification information I.INF from the terminal equipment (FIG. 21 and FIG. 22), a routing header (RH) to a predetermined outgoing path is set in an addition circuit (already explained) connected to the terminal equipment via the microprocessor (MPU). At this time, the attributes of the call are checked. When a voice, video, or other call requiring real time processing is detected, priority processing is performed on the routing header for passage through the module $SRM_{21}$ so that the input information packet of the call is transferred and processed on a priority basis.

The addition circuit adds the routing header to the input information and sends the same to, for example, the module $SRM_{11}$ of the input stage.

The module $SRM_{11}$ views the routing header and transfers the information to the module $SRM_{21}$ of the middle stage.

Next, in the modules $SRM_{31}$ to $SRM_{3N/n}$ of the output stage, since the microprocessor (MPU) has already set the module $SRM_{21}$, for example, as the priority receiving party (of course, another priority transfer route also may be determined in advance), the input information packet is stored in the predetermined FIFO memory 85 of the FIFO memories 85 (for example, the FIFO memory of the topmost section in the figure) through the selector SEL 84 in FIG. 27. On the other hand, when a priority transfer processing request signal is input from the microprocessor (MPU) 15 via the signal distributor (SD) 101 to the controller 105 shown in FIG. 28, this is sent to the selector 106 as a switching signal SWS. By this, unlike the case of FIG. 25, where the selection number of the selector 90 is successively changed by the output of the counter 91, in the case of FIG. 28, fixed priority information is output from the selector 106, so the selector 90 is selected for transfer of information of the FIFO memory designated for priority processing. In this example, the selector 90 (HIGH) at the topmost section of FIG. 28 is selected.

The information is sent through the fixed priority level decision circuit 92, encoder 93, and adder (ADD) 94 to the selector (SEL) 86 shown in FIG. 27. The selector (SEL) 86 selects the memory of the topmost section of the FIFO memory 85 and sends it to the modules $SRM_{31}$ to $SRM_{3N/n}$ at their input ends.

In this way, for calls requiring real time processing, a priority route can be designated and control effected for the easy transfer through the modules.

Next, an explanation will be given of the priority transfer processing in the case where the buffers in the modules, i.e., the FIFO memories, show an overload state. The selector control circuit (SC) 97 of FIG. 27 receives as input the transfer requests (*1 to **n) (same as R in FIG. 7) from the FIFO memories 85. Along with this, the storage states of the FIFO memories 85 are input as overload signals ##1 to ##n. These overload signals can be set based on the criteria of information of a certain value or more stored in the FIFO memories. The controller 105 of FIG. 28 receives the overload signals ##1 to ##n as input and sends them all together through the signal distributor (SD) 101 to the microprocessor (MPU) as master information. The microprocessor (MPU) analyzes the master information (Δ1 to Δn), reads detailed information through the signal distributor (SD), and discharges the information from the overload state FIFO memories 85 on a priority basis, so sends a control signal $S_c$ and controls the selectors 106 and 90.

Therefore, if the FIFO memory of the topmost section, for example, out of the FIFO memories 85 of FIG. 27 is in an overload state, the selectors 90 of FIG. 28 are controlled so that the transfer request *1 is selected. Further, when there are a plurality of FIFO memories in an overload state, selection is made by the fixed priority level decision circuit 92.

In this case, even if an overload state occurs, there is no rewriting of the routing headers by the microprocessor (MPU) 15 and addition circuit (11). This is so that there is no reversal of the order of flow of the packets.

In this way, the packet information stored in an overload state FIFO memory is sent out from the modules SRM on a priority basis without route modification.

Finally, various embodiments (second to fifth embodiments) of the self-routing speech module (SRM) shown in FIG. 8A will be proposed. Note that the first embodiment of the self-routing speech path (SRSP) has already been shown in FIG. 3 to FIG. 7. First, explanation will be made of the second embodiment.

Figure 29:
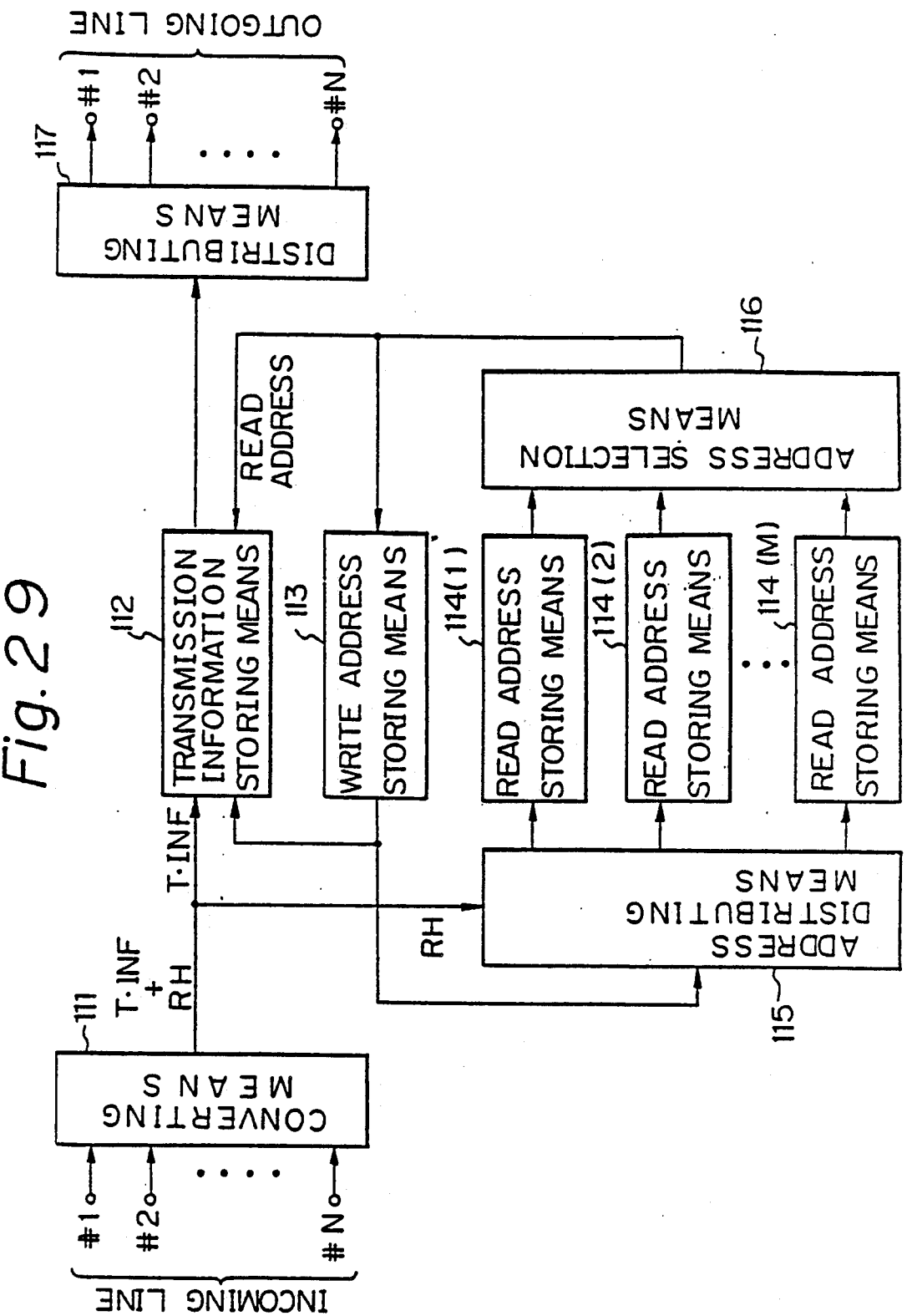
FIG. 29 is a principle block diagram of a second embodiment of the self-routing switch module.

FIG. 29 is a principle block diagram of a second embodiment of the self-routing speech path. In the self-routing switch module SRM shown in FIG. 7, provision was made of FIFO memories to avoid packet collisions due to concentration of transfer information, e.g., packets, at the same output end. However, when there are N number of input ends and output ends, respectively, $N^2$ FIFO memories are required. Therefore, an increase in the number of incoming lines and outgoing lines results in an expotential increase in the number of requisite FIFO memories. Further, the content to be stored in the FIFO memories is the packet as a whole. To give a buffer function, the storage capacity of the FIFO memories is set to enable storage of a plurality of packets. Considering this, FIFO memories with large storage capacities are required. However, even if the storage capacity of the FIFO memories is set large, since the probability of occurrence of packet collisions is not high, usually use is not made of all the storage regions of the FIFO memories and the efficiency of use of the memories is not high.

Therefore, in the second embodiment, provision is made of a self-routing speech path which can deal with an increase in the number of incoming lines and outgoing lines without a major increase in the memory means and which can use the memory means with a high efficiency. In FIG. 29, there are provided a plurality of incoming lines #1 to #N and a plurality of outgoing lines #1 to #M, with inputs to each incoming line. Transmission information with routing headers is autonomously switched to outgoing lines designated based on the routing headers. A converting means 111 converts the transmission information input in parallel from the plurality of incoming lines to a time-series format. A transmission information storing means 112 stores sequentially the transmission information T.INF sequentially sent from the converting means 111. A write address storing means 113 stores the addresses for accessing the transmission information storing means 112 and sequentially gives the same to the transmission information storing means 112 as write addresses. A plurality of read address storing means 114(1) to 114(M) are provided corresponding to the plurality of outgoing lines. An address distributing means 115, based on the routing header RH of the transmission information which is sent from the write address storing means 113 and stored in the address of the means 112, stores addresses in the read address storing means 114 corresponding to the outgoing line designated by the routing header. A address selecting means 116 selects sequentially the plurality of read address storing means 114(1) to 114(M) and gives the stored addresses to the transmission information storing means 112 as read addresses and stores them in the write address storing means 113. A distributing means 117 distributes the transmission information sequentially read out from the transmission information storing means 112 by the address selection of the address selection means 116 to the outgoing line corresponding to the selected read address storing means 114.

The packet or other transmission information input to the plurality of incoming lines is converted by the converting means 111 to a time-series data format and sequentially stored in the transmission information storing means 112. The address designation to the transmission information storing means 112 at this time is performed by the address given from the write address storing means 113. At the same time as this address designation, the address from the write address storing means 113 is stored in the read address storing means 114 corresponding to the outgoing line designated by the routing header RH of the transmission information written in that address position by the address distributing means 115. In this way, the various transmission information is stored in the transmission information storing means 112. Further, the read address storing means 114 corresponding to the destination outgoing line of the transmission information stored in the transmission information storing means 112 has stored therein the address for reading the transmission information.

The address selecting means 116 sequentially reads out the stored read addresses from the read address storing means 114(1) to 114(M) and, using the same, reads the transmission information from the transmission information storing means 112. The distributing means 117 distributes the read transmission information to the outgoing line corresponding to the destination of the transmission information. Further, the read addresses read from the read address storing means 114(1) to 114(M) are again stored in the write address storing means 113 and used for address designation of the transmission information storing means 112.

Figure 30:
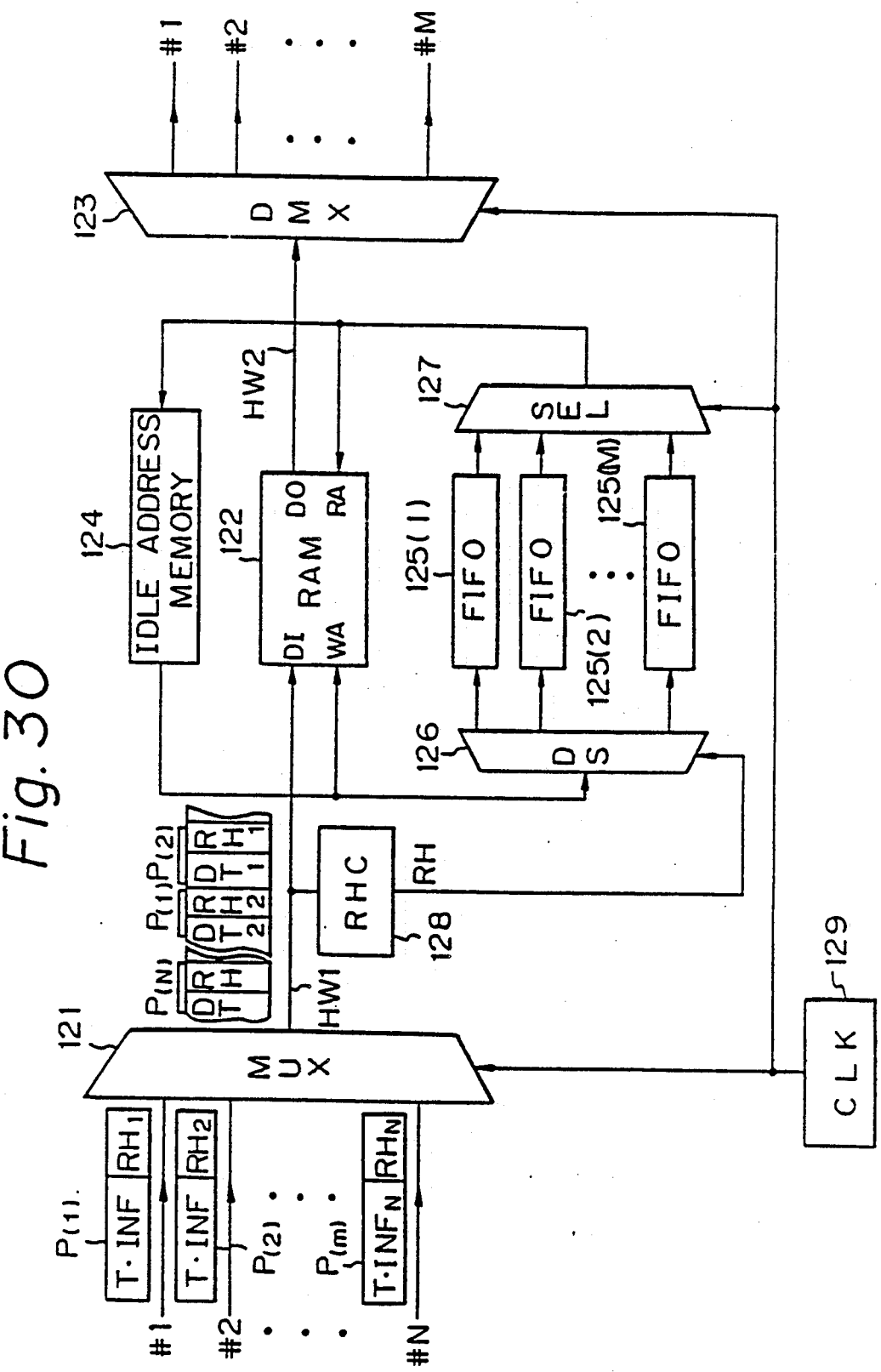
FIG. 30 is a circuit diagram showing a specific example for realizing a second embodiment of FIG. 29.

FIG. 30 is a circuit diagram showing a specific example for realizing the second embodiment of FIG. 29. The time-division multiplexer (MUX) 121 holds N number of incoming lines #1 to #N and performs time-division multiplexing on the packets P(l) to P(N) input in parallel to the incoming lines #1 to #N to place them in a time-series format and sends them to the input highway HW1. The input highway HW1 is connected to the data input terminal DI of a random access memory (RAM) 122. The packets on the input highway HW1 are successively stored in the RAM 122. The address designation for the RAM 122 is performed using the addresses stored in the idle address memory 124. The idle address memory 124 is comprised of an FIFO memory and has a capacity able to store a number of addresses corresponding to the number of addresses of the RAM 122.

The address output from the idle address memory 124 is led to the write address input terminal WA of the RAM 122 and the input terminal of the address distributor (DS) 126. The address distributor 126 is switched and controlled by the routing header copier (RHC) 128 and the input address is stored in one of the outgoing line FIFO memories 125(1) to 125(M). M number of FIFO memories 125(1) to 125(M) are provided corresponding to the M number of outgoing lines #1 to #M accommodated in a time-division demultiplexer 123. These have a capacity able to store a plurality of addresses for avoiding collision of packets in the outgoing lines #1 to #M. The routing header copier 128 is connected to the highway HW1. The routing header RH of the packet on the input highway HW1 is read and given to the address distributor 126.

The contents of the FIFO memories 125(1) to 125(M) are successively selected and read by the address selector (SEL) 127 and sent to the read address input terminal RA of the RAM 122 and the input terminal of the idle address memory 124. The packet information read from the data output terminal DO of the RAM 122 is successively sent to the output highway HW2. The packet information on the output highway HW2 is input to the time-division demultiplexer 123 where it is successively allocated to the outgoing lines #1 to #M. The timedivision multiplexer 121, address selector 127, and time-division demultiplexer (DMX) 123 respectively are operated with clock timing by a clock generator (CLK) 129.

The operation of the second embodiment will be described below. Assume that packets P(l) to P(N) are input to the incoming lines #1 to #N of the time-division multiplexer. The packets P(l) to P(N) are comprised of the transmission information T.INF and routing headers RH. The time-division multiplexer 121 executes time-division multiplexing on the packets P(l) to P(N) to rearrange them into a time-series data format and sends the same to the input highway HW1. Therefore, the transmission speed on the input highway HW1 is N times the transmission speed on the incoming lines #1 to #N.

These packets P(l) to P(N) are stored successively in the RAM 122. The address designation on the RAM 122 at this time is performed by using the addresses successively read from the idle address memory 124 as write addresses. The addresses read from the idle address memory 124 are sent to the RAM 122 and, simultaneously, stored in one of the FIFO memories 125(1) to 125(M) through the address distributor 126.

That is, the routing header copier 128 reads the routing headers RH of the packets P(l) to P(N) on the input highway HW1 and identifies, by the routing headers, to which of the outgoing lines #1 to #M the corresponding packets should be output. Next, using the routing headers RH, the address distributor 126 is switched and controlled and the addresses sent from the idle address memory 124 are stored in the FIFO memories 15 corresponding to the outgoing lines to which the packets stored at the corresponding positions of the RAM 122 should be sent.

For example, when the destination of the packet P(l) input to the incoming line #1 is the outgoing line #2, the packet P(l) is written at the address position of the RAM 122 designated by the address from the idle address memory 124. At the same time, the address is allocated to and stored in the FIFO memory 125(2) corresponding to the destination of the packet P(l), i.e., the outgoing line #2, under the control of the routing header copier 128 and address distributor 126. When there simultaneously exist a plurality of packets to be sent to the outgoing line #2 and collision occurs, the plurality of addresses are stored in the FIFO memory 125(2).

In this way, the packets P(l) to P(N) are successively stored in the RAM 122. At the same time, the address information of the RAM 122 in which the packets P(l) to P(N) are stored is stored in the outgoing line address FIFO memory 125 corresponding to the destination outgoing lines of the packets P(l) to P(N).

The reading of the packets P(l) to P(N) stored in the RAM 122 is performed by having the address selector 127 successively select the FIFO memories 125(1) to 15(M), in that order, by timing of the clock from the clock generator 129, reading the addresses stored therein, and applying the same to the RAM 122 as read addresses. By this, packets are successively sent to the time-division demultiplexer 123 from the RAM 122 via the output highway HW2. The addresses selected by the address selector 127 are simultaneously sent to the idle address memory 124 and reused as write addresses of the packets to the RAM 122.

The time-division demultiplexer 123 allocates the input packets successively to the outgoing lines #1 to #M such that, for example, the packet read by the address from the FIFO memory 125(1) is sent to the outgoing line #1, the packet read by the address from the FIFO memory 125(2) is sent to the outgoing line #2, . . . and the packet read by the address from the FIFO memory 125(k) is sent to the outgoing line #k. By this, the packets P(l) to P(N) input to the incoming lines #1 to #N are sent to the destination outgoing line designated by the routing headers RH.

Therefore, according to FIG. 29 and FIG. 30, the memory means necessary for constructing the self-routing speech path may be a RAM or other memory for storing the packets, an idle address memory for storing the idle addresses of the RAM, and outgoing line address memories 125 of a number corresponding to the outgoing lines for storing the read addresses of the RAM. As a result, even when there is an increase in the number of incoming lines and outgoing lines, it is possible to considerably reduce the number of necessary memory means. This effect is greater the larger the increase of the number of incoming lines and outgoing lines. Further, it is possible to construct the idle address memory 14 and outgoing line address memories 125 by small capacity memories able to just store the addresses of the RAM 122. Still further, it is possible to raise the efficiency of use of the RAM 122 storing the packet information. Note that when the RAM capacity is very large, the idle address memory 124 is not necessary.

Next, an explanation will be given of a third embodiment of the self-routing speech path. The intent of the third embodiment is, like the afore-mentioned second embodiment, to reduce the number of memory means.

Figure 31:
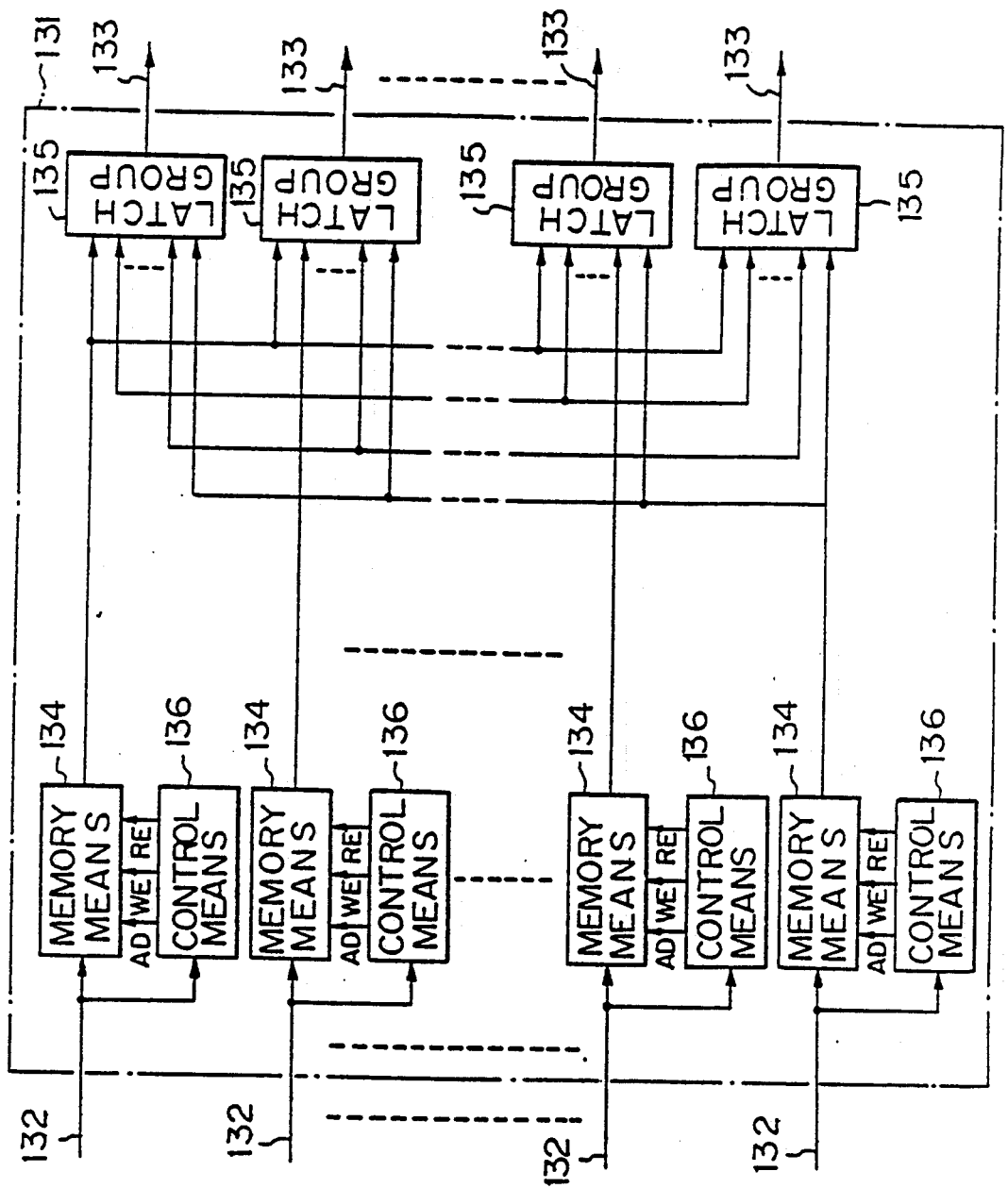
FIG. 31 is a principle block diagram of a third embodiment of a self-routing switch module.

FIG. 31 is a principle block diagram of the third embodiment of the self-routing speech path.

In FIG. 31, 131 is a self-routing speech path, which self-routing speech path 131 has N number of incoming lines 132 and N number of outgoing lines 133.

Reference numerals 134 show memory means, which memory means 134 are provided corresponding to the N number of incoming lines 132. The output lines of the memory means 134 are connected to the N number of outgoing lines 133 through the latch groups 135. The memory means 134 are memories which operate at a speed of N+1 times the transmission speed of the incoming lines.

Reference numerals 136 show control means, which control means 136 control the writing and reading with respect to the memory means 134. That is, due to the control means 136, the memory means 134 are operated at a speed of N+1 times the incoming line transmission speed, writing is performed at one of the phases of the speed of N+1, and reading is performed to the N number of outgoing lines 133 in the remaining N phases.

The control means 136 detect the routing headers from the input information of the incoming lines 132, cause the memory means 134 to operate at a speed of N+1 times the incoming line transmission speed, and, simultaneously, designate the addresses and perform writing and reading with respect to the memory means 134. At this time, the memory means 134 are written at one of the phases in the N+1 speed and read out to the N number of outgoing lines 133 during the remaining N phases. The transmission information read to the outgoing lines 133 is suitably latched by the related latch groups 135 and output.

Figure 32:
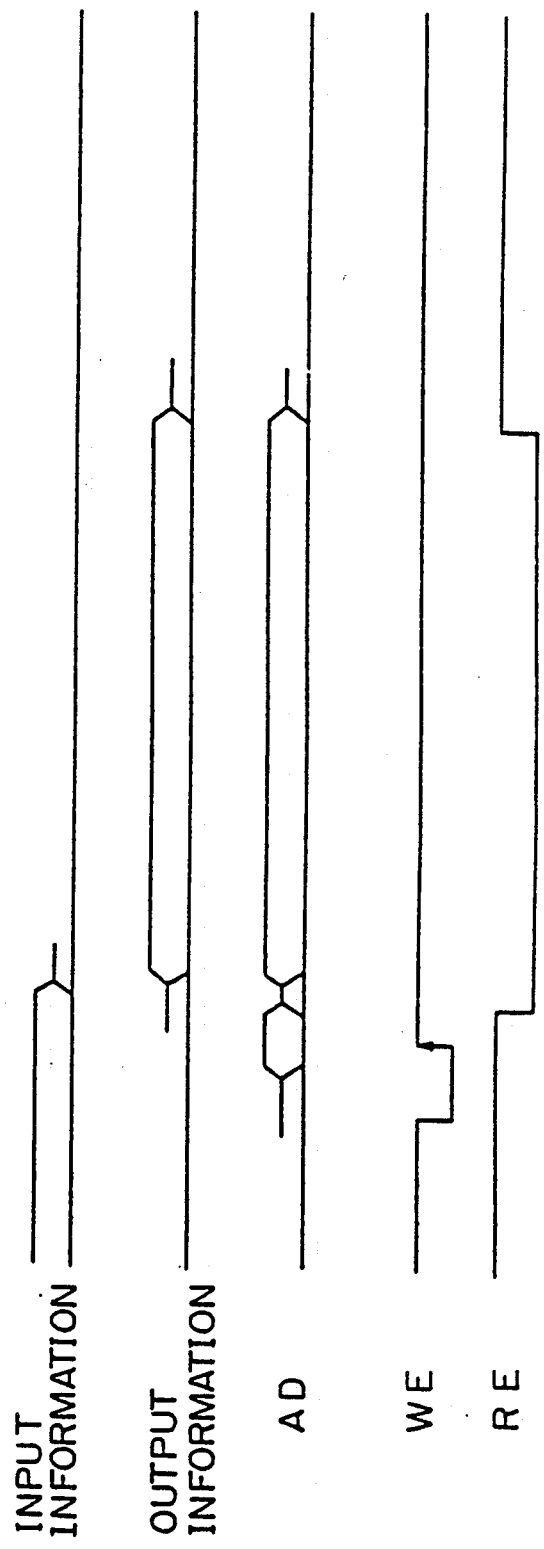
FIG. 32 is a timing chart showing signal waveforms appearing at principal portions of FIG. 31.

FIG. 32 is a timing chart showing signal waveforms appearing at principal portions of FIG. 31. It shows, from the top, the input information, output information, address control signal AD, write control signal WE, and read control signal RE.

Figure 33:
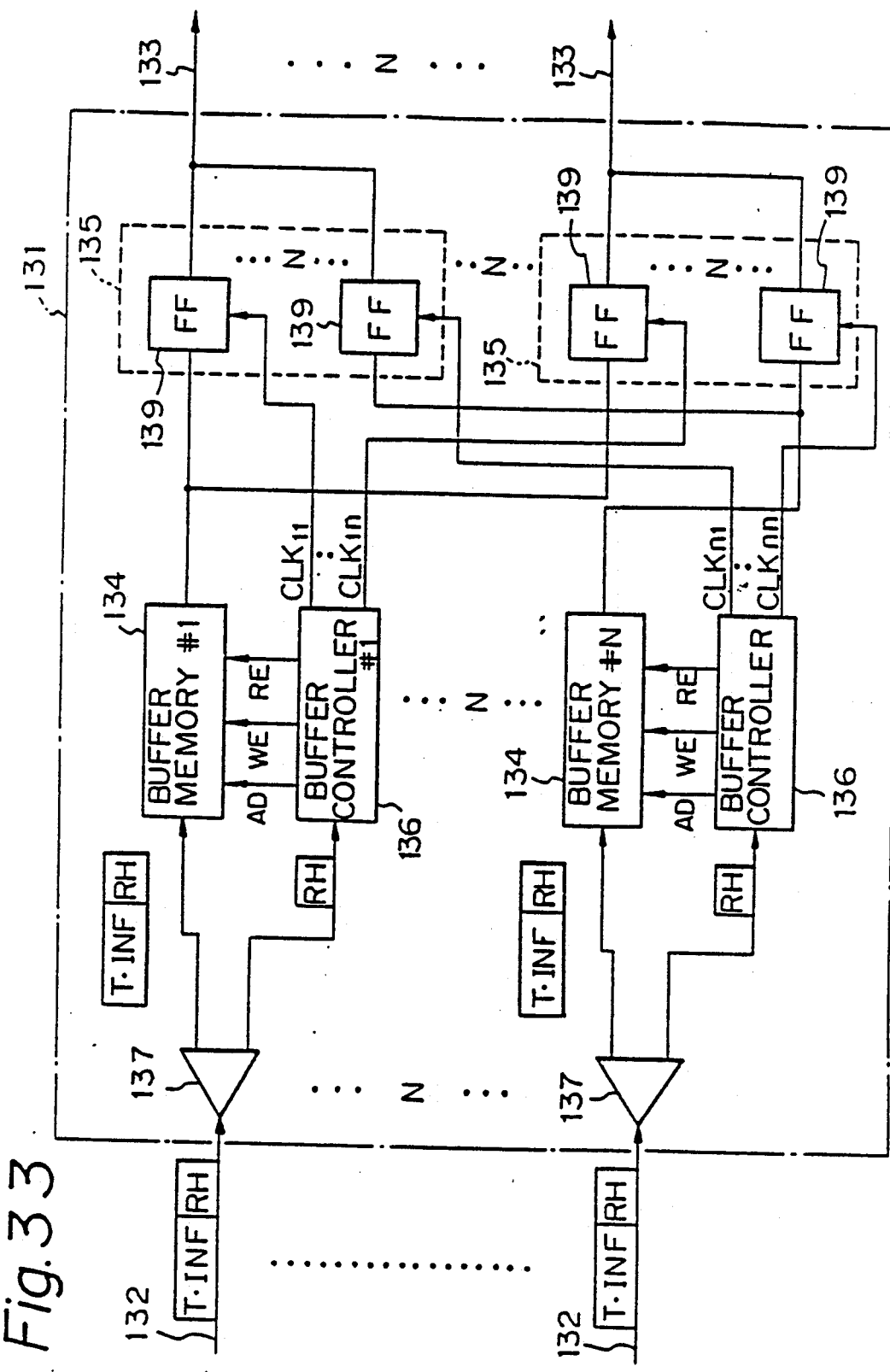
FIG. 33 is a circuit diagram showing a specific example for realizing the third embodiment of FIG. 31.

FIG. 33 is a circuit diagram showing a specific example for realizing the third embodiment of FIG. 31. In FIG. 33, 131 is a self-routing speech path, which self-routing speech path 131 has N number of incoming lines and N number of outgoing lines.

Reference numerals 134 show buffer memories used as the memory means. These buffer memories 134 are provided corresponding to the N number of incoming lines 132. The output lines of the buffer memories 134 are connected to the N number of outgoing lines 133 through the latch groups 135. Further, the buffer memories 134 are designed to operate at a speed of N+1 times the transmission speed of the incoming lines.

N number of latch groups 135 are provided corresponding to the buffer memories 134. Further, the latch groups 135 have N number of latches (flip-flops) 139.

Reference numerals 136 show buffer memory controllers used as control means, which buffer memory controllers 136 control writing and reading with respect to the buffer memories 134 and control the latch mode of the latches 139.

Reference numerals 137 show routing header detection circuits, which routing header detection circuits 137 detect routing headers from the input information, e.g., packets, of the incoming lines 132 and output the routing headers to the buffer memory controllers 136 and output the transmission information to the buffer memories 134.

Under the above construction, the routing header detection circuits 137 detect the routing headers from the input information of the incoming lines 132 and input the routing headers to the buffer memory controllers 136. At this time, the transmission information is sent from the routing header detection circuit 137 to the corresponding buffer memory 134.

The buffer memory controllers 136 cause the memory means 134 to operate at a speed N+1 times the incoming line transmission speed and, simultaneously, designate the addresses by the address control signals AD and perform writing and reading with respect to the buffer memories 134 by the write control signals WE and read control signals RE. At this time, the buffer memory controllers 136 view the routing headers RH and control the buffer memories 134 for writing at one of the phases in the N+1 speed and reading to the N number of outgoing lines during the remaining N phases.

Further, at the same time, the buffer memory controllers 136 output latch control signals $CLK_{ij}$ (where i and j are both 1 to N) to the latches 139. By this, the output information read to the outgoing line 133 is suitably latched by the corresponding one of the latch groups 135 and output to the required outgoing line 133.

Figure 34:
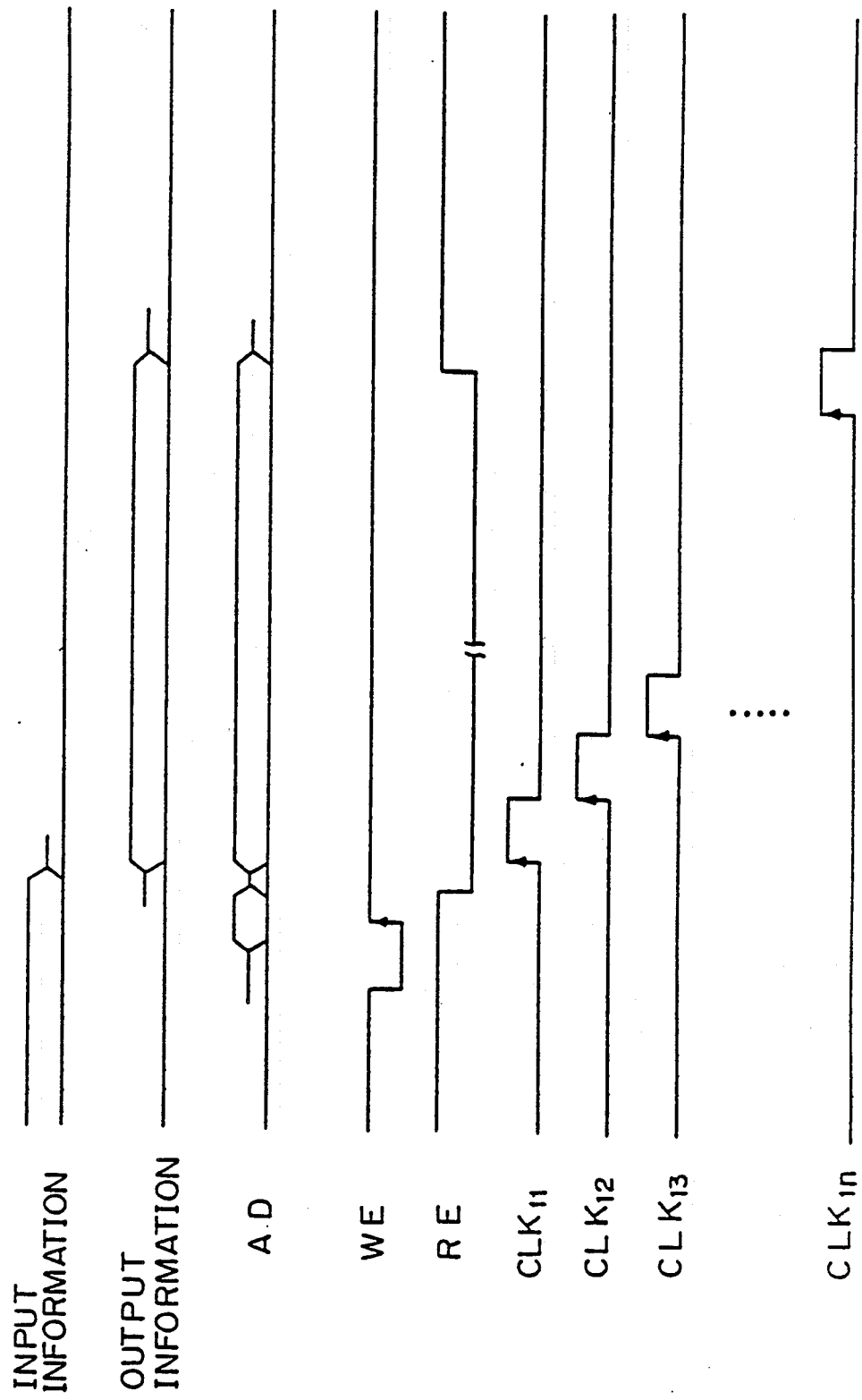
FIG. 34 is a timing chart showing signal waveforms appearing at principal portions of FIG. 33.

FIG. 34 is a timing chart showing signal waveforms appearing at principal portions of FIG. 33. It shows, from the top, the input information, output information, address control signal AD, write control signal WE, i.e., write enable, read control signal RE, i.e., read enable, and latch control signals $CLK_{11}$, $CLK_{12}$, $CLK_{13}$, ... and $CLK_{ln}$.

Note that in FIG. 34, the write control signal WE and read control signal SE indicate "enable" at the L level and the latch control signal (clock) $CLK_{ij}$ indicates "data latch" at the H level.

The latch control signals differ by one clock in each phase.

In this way, since provision is made of a number of buffer memories 134 corresponding to the incoming lines, the buffer memories 134 are operated at a speed of N+1 times the incoming line (outgoing line) transmission speed, writing is performed at one of the phases in the N+1 speed, and reading is performed to the N number of outgoing lines during the remaining N phases, the number of memories (memories corresponding to the FIFO memories FM of FIG. 7) can be reduced to 1/N and, thereby, the size of the circuit can be reduced.

Next, an explanation will be given on a fourth embodiment of the self-routing speech path. The intent of the fourth embodiment is, like the afore-mentioned second embodiment, to reduce the number of memory means.

Figure 35:
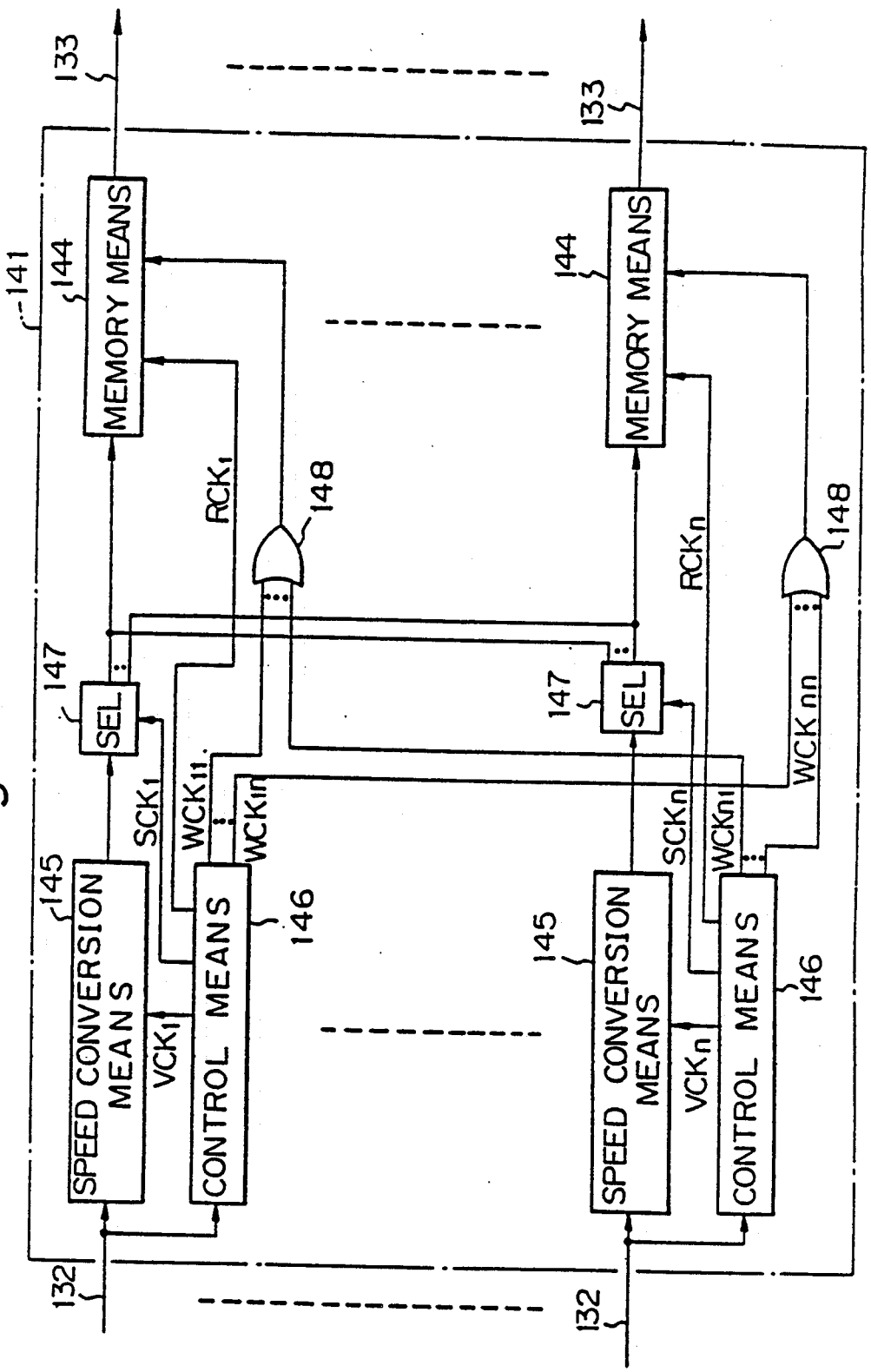
FIG. 35 is a principle block diagram of a fourth embodiment off a self-routing switch module.

FIG. 35 is a principle block diagram of the fourth embodiment of the self-routing speech path.

In FIG. 35, 141 is a self-routing speech path, which self-routing speech path 141 has N number of incoming lines 132 and N number of outgoing lines 133.

Reference numerals 144 show memory means, which memory means 144 are provided corresponding to the N number of outgoing lines 133. The memory means 144 are memories which operate at a speed of N+1 times the transmission speed of the incoming lines.

Reference numerals 145 show speed conversion means, which speed conversion means 145 convert the input information to a speed of N+1.

Reference numerals 146 show control means, which control means 146 control the speed conversion means 145, control the selectors (SEL) 147, and control writing and reading with respect to the memory means 144. That is, due to the control means 146, the memory means 144 are operated at a speed of N+1 times the incoming line transmission speed, the information of the N number of incoming lines is written under time division during N phases in the speed of N+1, and the information is read to the outgoing lines 133 at the remaining one phase.

The selectors 147 suitably allocate the input information from the speed conversion means 145 to the memory means 144 corresponding to the outgoing lines.

Reference numerals 148 are OR gates, which OR gates 148 enable the write control signals from the control means 146 to be supplied to the memory means 144.

The input information of the incoming lines 132 is converted by the speed conversion means 145 to a speed N+1 times the incoming line transmission speed. The control means 146 detect the routing headers from the input information and send the control signals $VCK_i$ (i is 1 to n) to the speed conversion means 145, whereby, input information from the speed conversion means 145 is sent to the memory means 144.

Further, the control means 146 send the control signals $SCK_i$ to the selectors 147, whereby the selectors 147 are suitably switched and input information from the speed conversion means 145 is sent to the desired memory means 144. At this time, simultaneously, the write control signals $WCK_{ij}$ (i and j being respectively 1 to n) output from the control means 146 perform writing and reading with respect to the memory means 144 at the following timing. That is, writing is performed on the N number of incoming lines 132 under the time division method during the N phases in the speed of N+1, and reading is performed to the outgoing lines at the remaining one phase.

Figure 36:
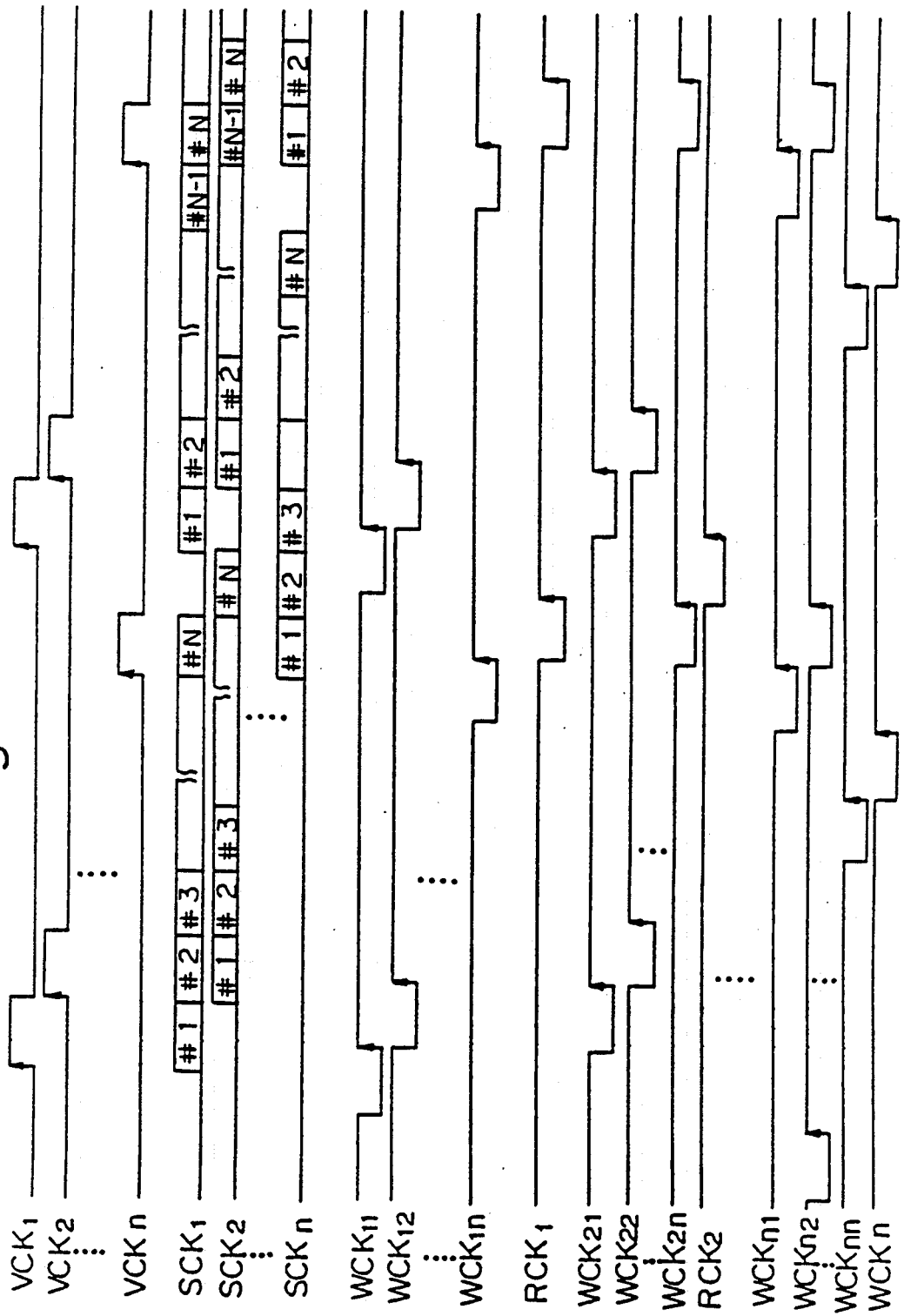
FIG. 36 is a timing chart showing signal waveforms of principal portions of FIG. 35.

FIG. 36 is a timing chart showing signal waveforms appearing at principal portions of FIG. 35. It shows, from the top, the speed conversion control signal $VCK_i$, the selector control signal $SCK_i$, the write control signal $WCK_{ij}$, and the read control signal $RCK_i$. Note that #1 to #N correspond to the numbers of the incoming lines.

Figure 37:
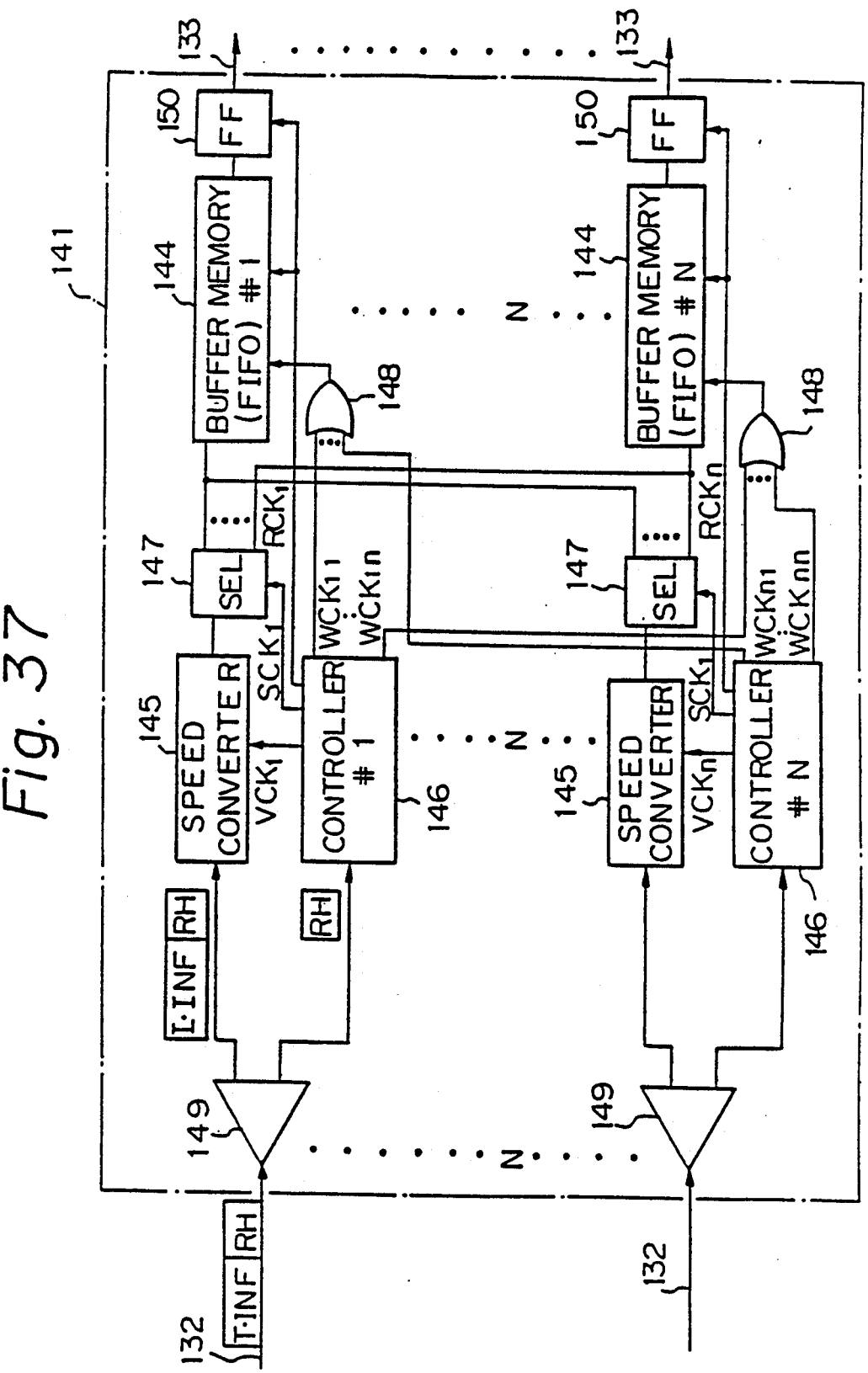
FIG. 37 is a circuit diagram showing a specific example for realizing the fourth embodiment of FIG. 35.

FIG. 37 is a circuit diagram showing a specific example for realizing the fourth embodiment of FIG. 35. In FIG. 37, 141 is self-routing speech path, which self-routing speech path 141 has N number of incoming lines 132 and N number of outgoing lines 133.

Reference numerals 144 show buffer memories used as the memory means. These buffer memories 144 are provided corresponding to the N number of outgoing lines 133. The buffer memories 144 are constructed as FIFO memories. Further, the buffer memories 144 are designed to operate at a speed of N+1 times the transmission speed of the incoming lines.

Reference numerals 145 are speed converters, which speed converters 145 convert the input information to a speed of N+1.

Reference numerals 146 are controllers which controllers 146 control the speed converters 145, control the selectors 147, and control writing and reading with respect to the buffer memories 144.

Reference numerals 147 are selectors, which selectors 147 receive the selector control signal $SCK_i$ from the controllers 146 and suitably allocate the transmission information T.INF from the speed converters 145 to the desired buffer memories 144 corresponding to the outgoing lines.

Reference numerals 148 are OR gates, which OR gates 148 enable supply of the write control signals $WCK_{ij}$ from the control means 146 to the buffer memories 144.

Reference numerals 149 show routing header detection circuits, which routing header detection circuits 149 detect routing headers RH from the input information, e.g., packets, of the incoming lines 132 and output the routing headers to the controllers 146 and output the transmission information to the speed converters 145.

Reference numerals 150 are latches (flip-flops), which latches 150 are used for returning the speed of the information to the original incoming line speed and sending the same to the outgoing lines.

Under the above construction, the routing header detection circuits 149 detect the routing headers RH from the input information of the incoming lines 132 and input the routing headers to the controllers 146. At this time, the transmission information is sent from the routing header detection circuits 149 to the speed converters 145.

The speed converters 145 convert the transmission information to a speed N+1 times the incoming line transmission speed.

Further, the controllers 146 receive the routing headers RH, view the destinations of the input information, and control the selectors 147 by the selector control signals $SCK_i$ (i being 1 to n) for switching to the buffer memories 144 corresponding to the destination outgoing lines and further control the clock $VCK_i$ for reading the transmission information from the speed converters 145, the clocks $WCK_{ij}$ (i and j being respectively 1 to n) for sharing and writing the N number of buffer memories 144, and the clocks $RCK_i$ for reading from the buffer memories 144.

Writing and reading with respect to the buffer memories 144 are performed by the following timing determined by the controllers 146. That is, information of the N number of incoming lines is written under the time division method during the N phases in the N+1 speed, while reading is performed to the outgoing lines 133 at the remaining one phase.

The output information read to the outgoing lines 133 is latched by the latches 150, which are actuated in synchronization with the clocks $RCK_i$ for return to the original incoming line transmission speed, and output to the required outgoing lines. Referring to FIG. 36, at the rising edge of the write clock $WCK_{ij}$, writing is performed on the buffer memories 144. At the rising edge of the read clock $RCK_i$, reading is performed from the buffer memories 144 and also latching is performed by the latches 150.

The write clocks $WCK_{11}$ to $WCK_{1n}$ (..., $WCK_{n1}$ to $WCK_{nn}$) differ in phase by one clock each.

In this way, since provision is made of a number of buffer memories 144 corresponding to the outgoing lines, the buffer memories 144 are operated at a speed of N+1 times the incoming line (outgoing line) transmission speed, information of the N number of incoming lines is written under the time division method during the N phases in the N+1 speed, and reading is performed to the outgoing lines at the remaining one phase, the number of memories corresponding to the FIFO memories FM of FIG. 7 can be reduced to 1/N and, thereby, the size of the circuit can be reduced.

Next, an explanation will be given on a fifth embodiment of the self-routing speech path. The intent of the fifth embodiment is, like the afore-mentioned second embodiment, to reduce the number of memory means.

Figure 38:
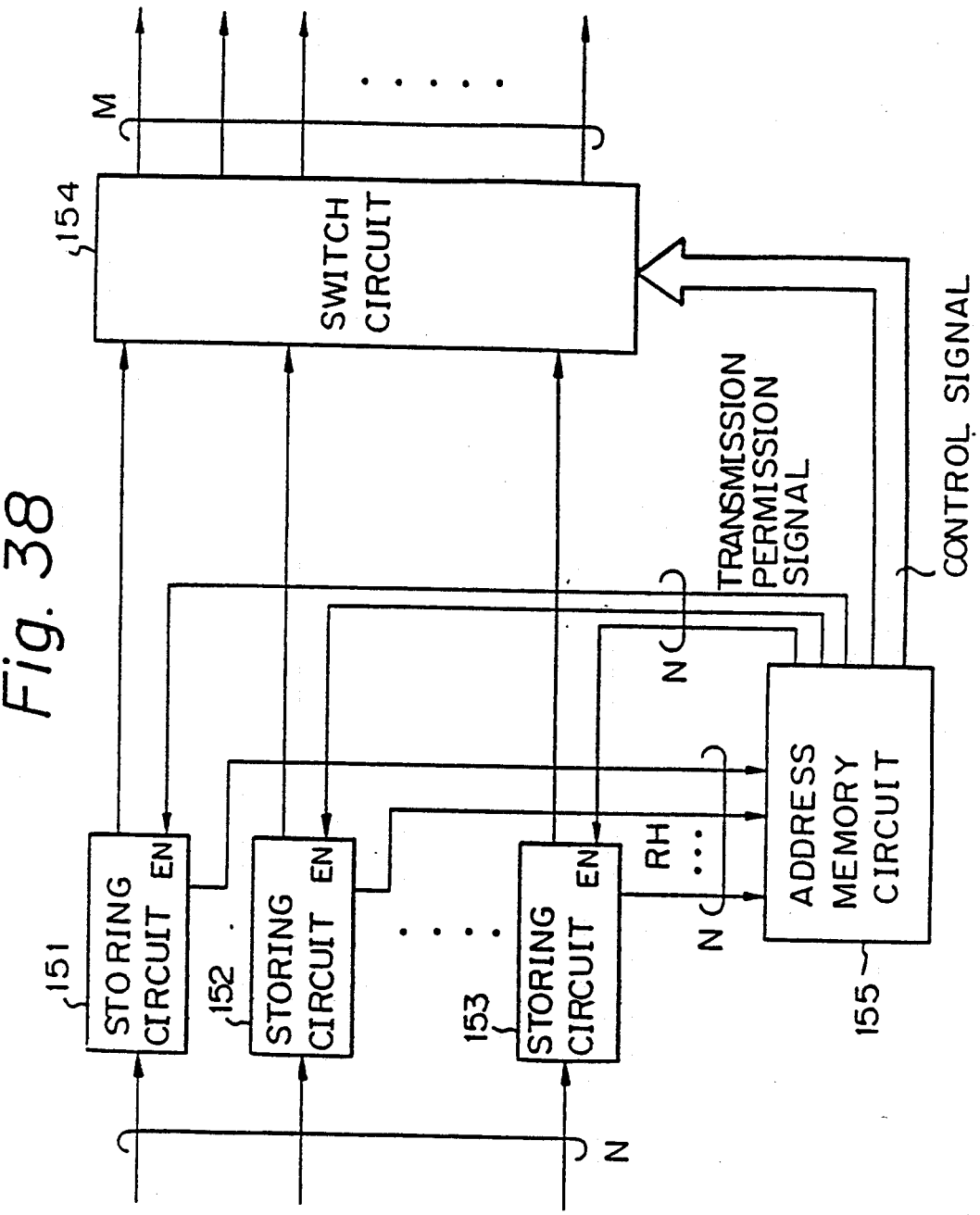
FIG. 38 is a principle block diagram of a fifth embodiment of a self-routing switch module.

FIG. 38 is a principle block diagram of the fifth embodiment of a self-routing speech path. The selfrouting speech path of the fifth embodiment has a plurality of incoming lines and a plurality of outgoing lines and sends input information, including routing headers, input from the incoming lines to the outgoing lines specified by the routing headers. A plurality of storing circuits 151 to 153 are provided corresponding to the incoming lines and temporarily store the input information input therefrom. A switch circuit 154 connects spatially the output terminals of the plurality of storing circuits 151 t 153 and the plurality of outgoing lines, in accordance with both the output signals and the control signals from the circuits 151 to 153. A memory circuit 155 has led to it in parallel, as address input, routing headers of the input information, e.g., packets, stored in the plurality of storing circuits 151 to 153 and holds the transmission permission signals to be sent to the plurality of storing circuits 151 to 153 as data corresponding to those addresses and control signals to be sent to the switching circuit 154.

The input information input to the incoming lines is held temporarily in the storing circuits 151 to 153. The routing headers RH of the input information are taken in parallel and given to the memory circuit 155 as its address input. The memory circuit 155 holds both the transmission permission signals and control signals corresponding to the addresses and sends the same to the storing circuits 151 to 153 and the switch circuit 154. When a collision of the input information occurs, one of the plurality of storing circuits for which collision has occurred is selected by the transmission permission signal and the data block stored therein is sent out. On the other hand, the switch circuit 154 is switched by the control signal and the selected input information is sent out to the outgoing lines corresponding to the routing headers. This operation is successively repeated so that the input information for which collision has occurred is successively sent out to the same outgoing lines under the time division method.

FIG. 39 is a circuit diagram showing a specific example for realizing the fifth embodiment of FIG. 38. The self-routing speech path is illustrated as having 4×4 incoming and outgoing lines. In the figure, 132(1) to 132(4) indicate the incoming lines, 162(1) to 162(4) indicate transmission information buffers comprised of FIFO memories, 163(1) to 163(4) indicate routing header buffers comprised of FIFO memories, 164(1) to 164(4) indicate routing header registers, 165 an arbitration memory, 166 indicates a matrix switch, 133(1) to 133(4) indicate outgoing lines, 168 indicates a transmission permission line, and 169 indicates a control line.

The incoming lines 132(1) to 132(4) receive as input the input information of the format shown in FIG. 4. This input information is comprised of routing header and transmission information T.INF. The routing header designates one of the outgoing lines 133(1) to 133(4) as the destination, and therefore, is comprised of two-bit information. The transmission information buffers 162(1) to 162(4) can successively store a plurality of input information as illustrated in FIG. 4. The routing header buffers 163(1) to 163(4) can successively store a plurality of only routing headers RH out of the input information shown in FIG. 4. The routing header registers 164(1) to 164(4) take out routing headers stored in the routing header buffers 163(1) to 163(4) one at a time and hold them temporarily. The outputs of the routing header registers 164(1) to 164(4) are led to the address inputs of the arbitration memory 165. The outputs of the routing header registers 164(1) to 164(4) are each two bits.

The arbitration memory 165 has stored therein one word data corresponding to each address. The words are comprised of a four bit information transmission permission signal and 16 bit crosspoint control signal. The information transmission permission signal has one bit each allocated to the transmission information buffers 162(1) to 162(4) and is information which determines if the buffers 162(1) to 162(4) may send the transmission information held to the matrix switch 166. When transmission is permitted, "1" is set. When it is not permitted, "0" is set. These information transmission permission signals are sent to the enable terminals of the buffers 162(1) to 162(4) via the transmission permission line 168. The crosspoint control information controls the connections between the inputs and outputs of the matrix switch 166 and is sent to the control terminal of the matrix switch 166 through the control line 169. The arbitration memory 165 has stored therein a number of words ($M^N$) corresponding to the number of outgoing lines to a power of the number of incoming lines.

Below, the operation of the speech path will be explained.

The input information input to the incoming lines 132(1) to 132(4) is stored in the transmission information buffers 162(1) to 162(4). The routing headers are stored in the routing header buffers 163(1) to 163(4). The routing headers are read successively from the routing header buffers 163(1) to 163(4) and stored temporarily in the routing header registers 164(1) to 164(4). The outputs of the routing header registers 164(1) to 164(4) are given to the arbitration memory 165 as address signals. The routing headers determine unilaterally to which outgoing line the input information of which incoming line is output.

The words corresponding to the addresses are read from the arbitration memory 165 and sent to the transmission information buffers 162(1) to 162(4) as transmission permission signals and to the matrix switch 166 as crosspoint signals. The transmission permission signals determine if the buffers 162(1) to 162(4) may sent out the stored information or if they should hold off on transmission for a while. By the crosspoint control signal, the matrix switch 166 performs switching so that the path between the buffers 162(1) to 162(4) and the outgoing lines 133(1) to 133(4) is built so the input information of the incoming lines 132(1) to 132(4) is sent to the outgoing lines corresponding to the routing headers.

If a collision occurs, i.e., the input information of the incoming lines 132(1) to 132(4) all have the same outgoing line as their destinations, the arbitration memory 165 makes only one of the transmission permission signals sent to the buffers 162(1) to 162(4) "1", gives transmission permission to the this transmission information buffer, and outputs the stored transmission information to the desired outgoing line through the matrix switch 166. On the other hand, it makes the other transmission information buffers hold off on the transmission of the input information. This operation is successively repeated so that the input information for which collision has occurred is successively sent out on to the same outgoing line.

In this way, by reading information from the arbitration memory 165 using the combination of the routing headers of the input information of the incoming lines as an address, it is possible to perform simultaneously arbitration processing during collisions, that is, processing to select one incoming line from a plurality of incoming lines which are colliding and connect it to the outgoing line, and path building of the matrix switch 166.

The fifth embodiment may be modified in various ways. For example, the arbitration memory may be made of a read only memory (ROM) and its content fixed. Alternatively, a RAM may be used and rewriting performed under external control. Further, the embodiment shown was for a self-routing speech path with 4×4 inputs and outputs, but the invention is not limited to this and can be applied to self-routing speech paths of P×Q (where P and Q are integers of 2 or higher) as well.

Therefore, in the case of N incoming lines, N number of buffers for holding the input information temporarily are sufficient. Compared with the case of $N^2$ buffers under FIG. 7, the number of buffers can be greatly reduced, thus enabling more compact and inexpensive apparatuses. Further, the content of the arbitration processing during collisions can be easily changed.

INDUSTRIAL APPLICABILITY

The present invention may be used for switching network of voice, facsimile data, computer data, and other switching data, in particular for high speed packet switching networks and high speed asynchronous transfer mode switching networks.

We claim:

1. A self-routing switching system for switching between a plurality of incoming lines and a plurality of outgoing lines, comprises:
   route setting means for receiving transmission information and identification information from the plurality of incoming lines, for generating control information for setting a path from an incoming line to an outgoing line designated by said identification information, and for adding said control information to said transmission information, said route setting means includes a call processor having a call setting phase and a transfer phase said call processor including
   means for receiving, in a call setting phase, notification from a calling party of transmission of said transmission information and said identification information and a destination party of said transmission information, and
   a table for storing a predetermined correspondence relationship between said identification information and said control information, and
   means for reading, in a transfer phase, said control information from said table in accordance with the received identification information and
   multipath self-routing speech path means for creating a plurality of paths between said plurality of incoming lines and outgoing lines from each one incoming line to each one outgoing line, for monitoring said control information and selecting and setting a path for said transmission information from said incoming line to said outgoing line from among said plurality of paths, and for autonomously transferring said transmission information to said outgoing line through said set path.

2. A self-routing switching system according to claim 1, wherein said multipath self-routing speech path means includes:
   at least one basic switching unit, said basic switching unit being comprised of a plurality of self-routing switch modules, said self-routing modules including
   an input stage self-routing switch connectable to the plurality of incoming lines,
   middle stage self-routing switch connected to said input stage module, and
   output stage self-routing switch connected to said middle stage module so as to form a multiple link connection between the input lines and the outgoing lines.

3. A self-routing switching system according to claim 2, having N incoming lines and N outgoing lines wherein said input stage self-routing switch comprises N/n number of self-routing switch modules, each of said self-routing switch modules being provided with n number of input ends and m number of output ends;
   said middle stage self-routing switch comprises m number of self-routing switch modules, each of said self-routing switch modules being provided with N/n number of input ends and N/n number of output ends;
   said output stage self-routing switch comprises N/n number of self-routing switch modules, each of said self-routing switch modules being provided with m number of input ends an n number of output ends.

4. A self-routing switching system according to claim 2, wherein said middle stage self-routing switch module comprises:
   a multiple link connected module including another input stage, another middle stage, and another output stage switch modules.

5. A self-routing switching system according to claim 2, wherein each of said self-routing switch modules has a plurality of input ends and a plurality of output ends and comprises an identical circuit group connected to said input end;
   said circuit group comprising:
   detection circuit means for detecting said control information;
   decode circuit means for decoding the detected control information;
   demultiplexer means for sending the transmission information to one of a plurality of output lines of said demultiplexer means in accordance with the decoding performed by said decode circuit means of said decode circuit;
   a delay circuit for delaying by a predetermined time said transmission information applied to said demultiplexer means;
   buffer memories connected to said plurality of output lines of said demultiplexer means and said output lines; and
   selector means for selectively connecting said buffer memories to said outgoing lines in accordance with one of a request signal from said buffer memory and an interruption.

6. A self-routing switching system according to claim 5, wherein each of said buffer memories comprises a first-in first-out (FIFO) memory.

7. A self-routing switching system according to claim 2, wherein
   said input stage self-routing switch comprises p number of input ends and q number of output ends (p<q);
   said middle stage self-routing switch being link connected to said input stage self-routing switch and comprising q number of input ends and p number of output ends;
   said output stage self-routing switch being link connected to said input stage self-routing switch and comprising q number of input ends and p number of output ends;
   (q−p) number of output ends of said input stage self-routing switch modules forming idle ends;
   (q−p number of input ends of said middle stage self-routing switch modules forming idle ends; and
   (q−p) number of input ends of said output stage self-routing switch modules forming idle ends.

8. A self-routing switching system according to claim 7, further comprising
   a number of self-routing switch modules each comprising the respective said input stage, middle stage, and output stage self-routing switches and the number of self-routing switch modules corresponding to the number of incoming lines
   all the output ends and input ends, including said (q−p) number of idle output ends and (q−p) number of idle input ends, between said input stage and middle stage self-routing switch modules, being mutually link connected,
   all the output ends and input ends between said middle stage and output stage self-routing switch modules, including said (q−p) number of idle input ends, being mutually link connected and,
   each output end of said middle stage self-routing switch module having at least two branched lines connected to respective ones of said output stage self-routing switch modules.

9. A self-routing switching system according to claim 2, further comprising an optional service module corresponding to one of said input stage self-routing switch, said middle stage self-routing switch and said output stage self-routing switch;
    means for detecting an optional service demand in said control information and for providing said transmission information from said incoming line to said optional service module.

10. A self-routing switching system according to claim 9, wherein said optional service module has input ends and output ends and comprises said middle stage self-routing switch.

11. A self-routing switching system according to claim 10, wherein said optional service module comprises an error control means for correcting at least said transmission information.

12. A self-routing switching system according to claim 11, said error control means includes means for detecting an error in at least said transmission information, and means for initiating retransmission of said at least said transmission information.

13. A self-routing switching system according to claim 10, wherein said input stage self-routing switch has output ends respectively connected to the input ends of said optional service module, and said output stage self-routing switch has input ends respectively connected to the output ends of said optional service module.

14. A self-routing switching system according to claim 10, further comprising:
    buffer memories provided for each of the input ends of said optional service module and wherein said optional service module comprises
    a processor,
    optional service means for receiving information stored in said buffer memories and executing an optional service in accordance with said optional service demand, and
    selector means for sending out information processed by said optional service means to one of said output ends.

15. A self-routing switching system according to claim 2, wherein said self-routing switch includes means for performing priority processing under the control of said call processor.

16. A self-routing switching system according to claim 15, wherein said means for performing priority processing performs said priority processing in accordance with said transmission information and includes means for transferring said transmission information in real time to said output stage self-routing switch.

17. A self-routing switching system according to claim 16, wherein said call processor includes means for modifying, in said call setting phase, said control information based on said transmission information so as to pass said transmission information through said multi-path self-routing speech path on a priority basis.

18. A self-routing switching system according to claim 15, further comprising:
    buffer memory means for storing at least said transmission information;
    means for detecting an overload state in said buffer memories, and
    wherein said means for performing priority processing includes means for starting said priority processing when information is stored in said buffer memories and said buffer memories are in an overload state, and
    means for setting said path on a priority basis in accordance with said overload state.

19. A self-routing switching system according to claim 18, wherein said means for detecting an overload state performs said detection based on said buffer memories storing at least a certain value or more of said transmission information.

20. A self-routing switching system according to claim 1, wherein said self-routing speech path comprises:
    converting means for converting both said transmission information form said incoming lines and said control information into a time-series format;
    transmission information storing means for successively storing transmission information sent successively from said converting means;
    write address storing means for storing addresses for accessing said transmission information storing means and successively providing said control information as addresses to said transmission information storing means;
    read address storing means, providing for said outgoing lines, for storing read addresses;
    address distributing means for storing said read addresses in said read address storing means corresponding to respective outgoing line designated by control information stored in the addresses of said transmission information storing means;
    address selecting means for successively selecting said read address storing means and providing the read addresses to said transmission information storing means as read addresses and for storing the read addresses in said write address storing means; and
    distributing means for distributing the transmission information successively read from said transmission information storing means by the address selection of said address selecting means to the outgoing line corresponding to the said selected read address storing means.

21. A self-routing switching system according to claim 20, wherein said transmission information storing means is comprised of a random access memory (RAM), said read address storing means is comprised of a first-in first-out (FIFO) memory, and said write address storing means is comprised of an FIFO memory which successively stores said read addresses.

22. A self-routing switching system according to claim 1, wherein said self-routing speech path is comprised of:
    memory means for storing said transmission information from said incoming lines and said control information at N+1 times a transmission speed of said incoming lines (wherein N is the number of said incoming lines);
    control means for controlling the writing and reading with respect to said memory means based on said control information and for executing writing control at one phase out of the N+1 phases formed by the N+1 times the transmission speed and executing reading control during the remaining N phases; and
    latch means for temporarily holding read information from said memory means and for providing, based on the control of the corresponding said control means, said temporarily held read information.

23. A self-routing switching system according to claim 22, further comprising:
    detection means for detecting said control information and inputting said detected control information to said control means.

24. A self-routing switching system according to claim 1, wherein said self-routing speech path comprises:
    memory means, provided for each of said outgoing lines, which operates at N+1 times a transmission speed of said incoming lines (wherein N is the number of said incoming lines);
    speed conversion means, provided for each of said incoming line, for converting said transmission information from said incoming lines and said control information to said N+1 speed;
    selector means for allocating the output of each said speed conversion means to a desired one of said memory means; and
    control means for controlling said speed conversion means, said selector, and said memory means, for performing writing of said transmission and said control information in said memory means during N phases of N+1 number of phases formed by said N +1 speed, and for performing reading to said outgoing lines at the remaining one phase.

25. A self-routing switching system according to claim 24, further comprising:
    detection means for detecting said control information and inputting said detected control information to said control means.

26. A self-routing switching system according to claim 25, further comprising:
    a plurality of flip-flops, and wherein each of said memory means is comprised of
    a first-in first-out (FIFO) memory, the outputs are sent through respective ones of said flip-flops to corresponding ones of said outgoing lines, said flip-flops are controlled by corresponding ones of said control means.

27. A self-routing switching system according to claim 1, wherein said self-routing speech path is comprised of:
    storing circuits means, provided for each of said incoming line, for storing said transmission information from said incoming lines and said control information;
    memory circuit means for receiving, as an address input, said control information in each of said storing circuit means, for providing an input information transmission permission signal to one of said storing circuits means, and for providing output control signals; and
    switch circuit means for outputting said transmission information, provided by said memory circuit means based on said input information transmission permission signal, to one of said outgoing lines designated by said control signal form said memory circuit means.

28. A self-routing switching system according to claim 27, wherein:
    said storing circuits means are provided with buffers means for respectively storing said transmission information and said control information;
    said switch circuit means is comprised of a matrix switch connected to receive information from said buffers means and to provide said received information a corresponding one of said outgoing lines; and
    said memory circuit means is comprised of an arbitration memory means for combining the control information from said buffers means to form address input and for providing, to one of said storing circuits, a pair of said input information transmission permission signal and a crosspoint control signal to said matrix switch so as to provide said transmission information to a desired one of said outgoing lines.

29. A self-routing switch system for switching between a plurality of incoming lines and a plurality of outgoing lines, comprising:
    route setting means for receiving transmission information and identification information from the plurality of incoming lines, for generating control information used to set a path from an incoming line to an outgoing line designated by said identification information and for adding said control information to said transmission information; and
    multipath self-routing speech path means for creating a plurality of paths between said plurality of incoming lines and outgoing lines from each one incoming line to each one outgoing line, for monitoring said control information and selecting and setting a path for said transmission information from said incoming line to said outgoing line from among said plurality of paths, and for autonomously transferring said transmission information to said outgoing line through said set path, said multipath self-routing speech path means including a basic switching unit that includes a plurality of self-routing switch modules, each of said self-routing switch modules including
        an input stage self-routing switch connectable to the plurality of incoming lines,
        middle stage self-routing switch connected to said input stage module, and
        output stage self-routing switch connected to said middle stage module so as to form a multiple link connection between the input lines and the outgoing lines.

* * * * *